United States Patent
Stenberg et al.

(10) Patent No.: US 10,944,648 B2
(45) Date of Patent: Mar. 9, 2021

(54) METHOD AND SYSTEM FOR ASSISTED AUTOMATIC NETWORK SERVICE REQUEST AND DELIVERY IN A NETWORK ENVIRONMENT

(71) Applicant: Nokia Technologies Oy, Espoo (FI)

(72) Inventors: Kaj Stenberg, Sundsberg (FI); Haitao Tang, Espoo (FI)

(73) Assignee: Nokia Technologies Oy, Espoo (FI)

( * ) Notice: Subject to any disclaimer, the term of this patent is extended or adjusted under 35 U.S.C. 154(b) by 29 days.

(21) Appl. No.: 16/493,753

(22) PCT Filed: Mar. 15, 2017

(86) PCT No.: PCT/IB2017/051513
§ 371 (c)(1),
(2) Date: Sep. 12, 2019

(87) PCT Pub. No.: WO2018/167537
PCT Pub. Date: Sep. 20, 2018

(65) Prior Publication Data
US 2020/0076709 A1    Mar. 5, 2020

(51) Int. Cl.
*H04L 12/24* (2006.01)
*H04W 24/02* (2009.01)
(Continued)

(52) U.S. Cl.
CPC .... *H04L 41/5054* (2013.01); *H04L 29/08171* (2013.01); *H04L 41/0806* (2013.01);
(Continued)

(58) Field of Classification Search
CPC ... H04L 29/08135–08288; H04L 41/08–0806; H04L 41/0823–0836;
(Continued)

(56) References Cited

U.S. PATENT DOCUMENTS 9,256,452 B1 * 2/2016 Suryanarayanan .......................... G06F 9/45558
2007/0178895 A1    8/2007 Bot
(Continued)

FOREIGN PATENT DOCUMENTS

EP            2442264 A1    4/2012
WO    2015/021248 A1    2/2015
(Continued)

OTHER PUBLICATIONS

"Network Functions Virtualisation (NFV); Management and Orchestration", ETSI GS NFV-MAN 001 V1.1.1, Dec. 2014, pp. 1-184.
(Continued)

*Primary Examiner* — Brendan Y Higa
(74) *Attorney, Agent, or Firm* — Nokia Technologies Oy

(57) ABSTRACT

A method, apparatus and computer program product are provided in accordance with example embodiments in order to provide methods, apparatuses, and/or systems that allow for the automatic request, definition, and provision of user-specific network services within a communication network environment. Some example implementations are directed to the use of new network entities, such as a service order portal, a self-operation entity, and/or other similar entities to accept potentially incomplete initial requirements requests from a network user and automatically develop and deploy network resources that are capable of fulfilling the device and/or user-specific needs of a given user.

20 Claims, 7 Drawing Sheets

(51) Int. Cl.
*H04W 28/24* (2009.01)
*H04W 72/08* (2009.01)
*H04L 29/08* (2006.01)

(52) U.S. Cl.
CPC ...... *H04L 41/0836* (2013.01); *H04L 41/0886* (2013.01); *H04L 41/5025* (2013.01); *H04L 67/1008* (2013.01); *H04L 67/1029* (2013.01); *H04W 24/02* (2013.01); *H04W 28/24* (2013.01); *H04W 72/087* (2013.01)

(58) Field of Classification Search
CPC . H04L 41/0876–0893; H04L 41/14–16; H04L 41/22; H04L 41/5041–5054; H04L 41/5096; H04L 67/10; H04L 67/1002–1036; H04W 16/00–12; H04W 28/10–26; H04W 72/04–10
See application file for complete search history.

(56) References Cited

U.S. PATENT DOCUMENTS

| | | | |
|---|---|---|---|
| 2016/0156513 A1 | 6/2016 | Zhang et al. | |
| 2016/0182315 A1* | 6/2016 | Salokanto | H04L 41/5054 709/226 |
| 2017/0003948 A1* | 1/2017 | Iyer | H04L 43/045 |
| 2017/0201465 A1* | 7/2017 | Alabiso | G06F 9/5027 |
| 2017/0208019 A1* | 7/2017 | Shimojou | H04L 41/0896 |
| 2018/0139106 A1* | 5/2018 | Senarath | H04L 67/16 |
| 2018/0262431 A1* | 9/2018 | Zhang | H04L 47/125 |

FOREIGN PATENT DOCUMENTS

| | | |
|---|---|---|
| WO | 2015/169333 A1 | 11/2015 |
| WO | 2016/150468 A1 | 9/2016 |
| WO | 2016/150627 A1 | 9/2016 |
| WO | 2016/152587 A1 | 9/2016 |
| WO | 2016/192639 A1 | 12/2016 |
| WO | 2016/192746 A1 | 12/2016 |

OTHER PUBLICATIONS

"3rd Generation Partnership Project; Technical Specification Group Services and System Aspects; Telecommunication management; Management concept, architecture and requirements for mobile networks that include virtualized network functions (Release 14)", 3GPP Ts 28.500 V14.0.0, Jan. 2017, pp. 1-27.

"3rd Generation Partnership Project; Technical Specification Group Services and System Aspects; Telecommunication management; Configuration Management (CM); Generic network resources Integration Reference Point (IRP); Network Resource Model (NRM) (Release 11)", 3GPP TS 32.622 V11.1.0, Jun. 2013, pp. 1-29.

Tiroumalmouroughane et al., "Automatic Policy Based Web Service Integration using Ontology", Proceedings of the International Conference on Informatics and Analytics, No. 74, Aug. 25-26, 2016, 7 pages.

Zhou et al., "Network Slicing as a Service: Enabling Enterprises' own Software-Defined Cellular Networks", IEEE Communications Magazine, vol. 54, No. 7, Jul. 2016, pp. 146-153.

International Search Report and Written Opinion received for corresponding Patent Cooperation Treaty Application No. PCT/IB2017/051513, dated Dec. 1, 2017, 17 pages.

"ZTE SDN/NFV ElasticNet White Paper V3.0", ZTE, Retrieved on Aug. 21, 2019, Webpage available at : https://res-www.zte.com.cn/mediares/zte/Files/PDF/White-Skin-Book/2016SDNNFV/ZTE-SDNNFV-ElasticNet-White-Paper-V31.pdf?la=en.

Ersue, "ETSI NFV Management and Orchestration An Overview", IETF, Nov. 8, 2013, 14 pages.

"5G Network Slicing in 5GTANGO", 5Gtango, Retrieved on Aug. 21, 2019, Webpage available at : https://www.5gtango.eu/blog/36-5g-network-slicing-in-5gtango.html.

* cited by examiner

METHOD AND SYSTEM FOR ASSISTED AUTOMATIC NETWORK SERVICE REQUEST AND DELIVERY IN A NETWORK ENVIRONMENT

RELATED APPLICATION

This application was originally filed as PCT Application No. PCT/IB2017/051513 filed Mar. 15, 2017.

TECHNICAL FIELD

An example embodiment relates generally to communications network technology, particularly in the context of particularized network resource allocation protocols that may be automatically applied and/or reconfigured within a given network environment.

BACKGROUND

Many modern communications networks have become tasked with supporting the ever-increasing quantities of devices and applications adopted by network users. Beyond simply increasing in volume, such devices and applications increasingly present divergent service needs, at least in the sense that many of the characteristics of the network traffic and network resource needs for a given application or device can vary significantly from application to application and from device to device. At the same time, users have come to expect and rely upon the ability to access and use network resources with consistent, predictable quality and reliability across a wide range of contexts and situations.

While networks and their operators are typically able to meet user expectation and demands, these ever-increasing demands for divergent, particularized network connectivity and throughput can place strains on finite network resources and raises a number of technical challenges. The inventors of the invention disclosed herein has identified these and other technical challenges, and developed the solutions described and otherwise referenced herein.

BRIEF SUMMARY

A method, apparatus and computer program product are therefore provided in accordance with an example embodiment in order to provide methods, apparatuses, and/or systems that automatically request, define, and provision particularized network services based on user-specific requirements.

In an example embodiment, a method is provided that includes receiving, at a service order portal, a request for network service, wherein the request for network service comprises a service requirements set, and wherein the service requirements set comprises a plurality of service requirements; determining, automatically and based at least in part on the service requirements set, a network resource set and a network configuration adapted to fulfill each service requirement within the plurality of service requirements associated with the service requirements set; determining, automatically, a time parameter, wherein the time parameter comprises an indication of the amount of time necessary to provide the network resource set and the network configuration necessary to fulfill each service requirement within the plurality of service requirements associated with the service requirements set; transmitting a proposed network service allocation set, wherein the proposed network service allocation set comprises the time parameter and an indication of the network resource set and the network configuration adapted to fulfill each service requirement within the plurality of service requirements associated with the service requirements set; receiving an indication that the proposed network service allocation set has been accepted; and providing, automatically, network services in accordance with the proposed network service allocation set.

In some example implementations of such a method, the service requirements set is an incomplete set. In some such example implementations, and in other example implementations, determining the network resource set and the network configuration adapted to fulfill each service requirement within the plurality of service requirements associated with the service requirements set comprises detecting that the service requirements set is an incomplete set.

In some such example implementations, and in other example implementations, determining the network resource set and the network configuration adapted to fulfill each service requirement within the plurality of service requirements associated with the service requirements set comprises requesting a prior configuration data set. In some such example implementations, and in other example implementations, determining the timing parameter comprises requesting a prior timing data set. In some such example implementations, and in other example implementations, providing, automatically, network services in accordance with the proposed network service allocation set comprises transmitting resource allocation instructions from the service order portal to a plurality of network entities.

In some example implementations, requesting a prior configuration data set comprises transmitting a message to a self-operation entity. In some such example implementations, and in other example implementations, requesting a prior timing data set comprises transmitting a message to a self-operation entity. In some such example implementations, and in other example implementations, the proposed network service allocation set further comprises a cost parameter, wherein the cost parameter is associated with the network resource set and the network configuration necessary to fulfill each service requirement within the plurality of service requirements associated with the service requirements set.

In another example embodiment, an apparatus is provided that includes at least one processor and at least one memory that includes computer program code with the at least one memory and the computer program code configured to, with the at least one processor, cause the apparatus to at least receive, at a service order portal, a request for network service, wherein the request for network service comprises a service requirements set, and wherein the service requirements set comprises a plurality of service requirements; determine, automatically and based at least in part on the service requirements set, a network resource set and a network configuration adapted to fulfill each service requirement within the plurality of service requirements associated with the service requirements set; determine, automatically, a time parameter, wherein the time parameter comprises an indication of the amount of time necessary to provide the network resource set and the network configuration necessary to fulfill each service requirement within the plurality of service requirements associated with the service requirements set; transmit a proposed network service allocation set, wherein the proposed network service allocation set comprises the time parameter and an indication of the network resource set and the network configuration adapted to fulfill each service requirement within the plurality of service requirements associated with the service requirements set; receive an indication that the proposed network service allocation set has been accepted; and provide, automatically, network services in accordance with the proposed network service allocation set.

In some example implementations of such an apparatus, the service requirements set is an incomplete set. In some such example implementations, and in other example implementations, determining the network resource set and the network configuration adapted to fulfill each service requirement within the plurality of service requirements associated with the service requirements set comprises detecting that the service requirements set is an incomplete set. In some such example implementations, and in other example implementations, determining the network resource set and the network configuration adapted to fulfill each service requirement within the plurality of service requirements associated with the service requirements set comprises requesting a prior configuration data set. In some such example implementations, and in other example implementations, determining the timing parameter comprises requesting a prior timing data set.

In some such example implementations, and in other example implementations, providing, automatically, network services in accordance with the proposed network service allocation set comprises transmitting resource allocation instructions from the service order portal to a plurality of network entities. In some such example implementations, and in other example implementations, requesting a prior configuration data set comprises transmitting a message to a self-operation entity. In some such example implementations, and in other example implementations, requesting a prior timing data set comprises transmitting a message to a self-operation entity. In some such example implementations, and in other example implementations, the proposed network service allocation set further comprises a cost parameter, wherein the cost parameter is associated with the network resource set and the network configuration necessary to fulfill each service requirement within the plurality of service requirements associated with the service requirements set.

In a further example embodiment, a computer program product is provided that includes at least one non-transitory computer-readable storage medium having computer-executable program code instructions stored therein with the computer-executable program code instructions including program code instructions configured to receive, at a service order portal, a request for network service, wherein the request for network service comprises a service requirements set, and wherein the service requirements set comprises a plurality of service requirements; determine, automatically and based at least in part on the service requirements set, a network resource set and a network configuration adapted to fulfill each service requirement within the plurality of service requirements associated with the service requirements set; determine, automatically, a time parameter, wherein the time parameter comprises an indication of the amount of time necessary to provide the network resource set and the network configuration necessary to fulfill each service requirement within the plurality of service requirements associated with the service requirements; transmit a proposed network service allocation set, wherein the proposed network service allocation set comprises the time parameter and an indication of the network resource set and the network configuration adapted to fulfill each service requirement within the plurality of service requirements associated with the service requirements set; receive an indication that the proposed network service allocation set has been accepted; and provide, automatically, network services in accordance with the proposed network service allocation set.

In some example implementations of such a computer program product, wherein the service requirements set is an incomplete set. In some such example implementations, and in other example implementations, determining the network resource set and the network configuration adapted to fulfill each service requirement within the plurality of service requirements associated with the service requirements set comprises detecting that the service requirements set is an incomplete set. In some such example implementations, and in other example implementations, determining the network resource set and the network configuration adapted to fulfill each service requirement within the plurality of service requirements associated with the service requirements set comprises requesting a prior configuration data set. In some such example implementations, and in other example implementations, determining the timing parameter comprises requesting a prior timing data set. In some such example implementations, and in other example implementations, providing, automatically, network services in accordance with the proposed network service allocation set comprises transmitting resource allocation instructions from the service order portal to a plurality of network entities.

In some such example implementations, and in other example implementations, requesting a prior configuration data set comprises transmitting a message to a self-operation entity. In some such example implementations, and in other example implementations, requesting a prior timing data set comprises transmitting a message to a self-operation entity. In some such example implementations, and in other example implementations, the proposed network service allocation set further comprises a cost parameter, wherein the cost parameter is associated with the network resource set and the network configuration necessary to fulfill each service requirement within the plurality of service requirements associated with the service requirements set.

In yet another example embodiment, an apparatus is provided that includes means for receiving, at a service order, a request for network service, wherein the request for network service comprises a service requirements set, and wherein the service requirements set comprises a plurality of service requirements; determining, automatically and based at least in part on the service requirements set, a network resource set and a network configuration adapted to fulfill each service requirement within the plurality of service requirements associated with the service requirements set; determining, automatically, a time parameter, wherein the time parameter comprises an indication of the amount of time necessary to provide the network resource set and the network configuration necessary to fulfill each service requirement within the plurality of service requirements associated with the service requirements set; transmitting a proposed network service allocation set, wherein the proposed network service allocation set comprises the time parameter and an indication of the network resource set and the network configuration adapted to fulfill each service requirement within the plurality of service requirements associated with the service requirements set; receiving an indication that the proposed network service allocation set has been accepted; and providing, automatically, network services in accordance with the proposed network service allocation set.

In some example implementations of such an apparatus, the service requirements set is an incomplete set. In some such example implementations, and in other example implementations, determining the network resource set and the network configuration adapted to fulfill each service requirement within the plurality of service requirements associated with the service requirements set comprises detecting that the service requirements set is an incomplete set. In some such example implementations, and in other example implementations, determining the network resource set and the network configuration adapted to fulfill each service requirement within the plurality of service requirements associated with the service requirements set comprises requesting a prior configuration data set.

In some such example implementations, and in other example implementations, determining the timing parameter comprises requesting a prior timing data set. In some such example implementations, and in other example implementations, providing, automatically, network services in accordance with the proposed network service allocation set comprises transmitting resource allocation instructions from the service order portal to a plurality of network entities. In some such example implementations, and in other example implementations, requesting a prior configuration data set comprises transmitting a message to a self-operation entity. In some such example implementations, and in other example implementations, requesting a prior timing data set comprises transmitting a message to a self-operation entity. In some such example implementations, and in other example implementations, the proposed network service allocation set further comprises a cost parameter, wherein the cost parameter is associated with the network resource set and the network configuration necessary to fulfill each service requirement within the plurality of service requirements associated with the service requirements set.

BRIEF DESCRIPTION OF THE DRAWINGS

Figure 1:
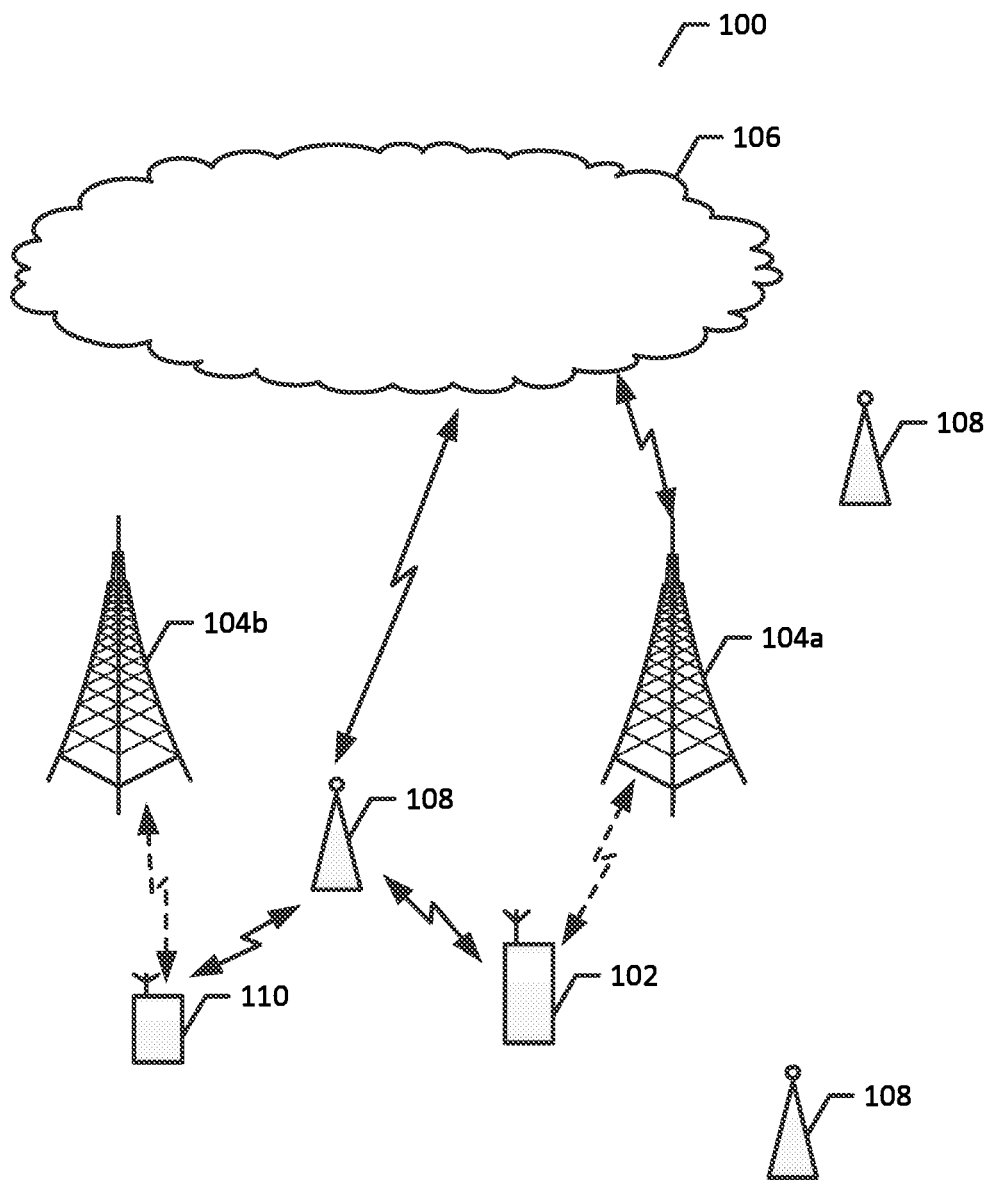
Figure 2:
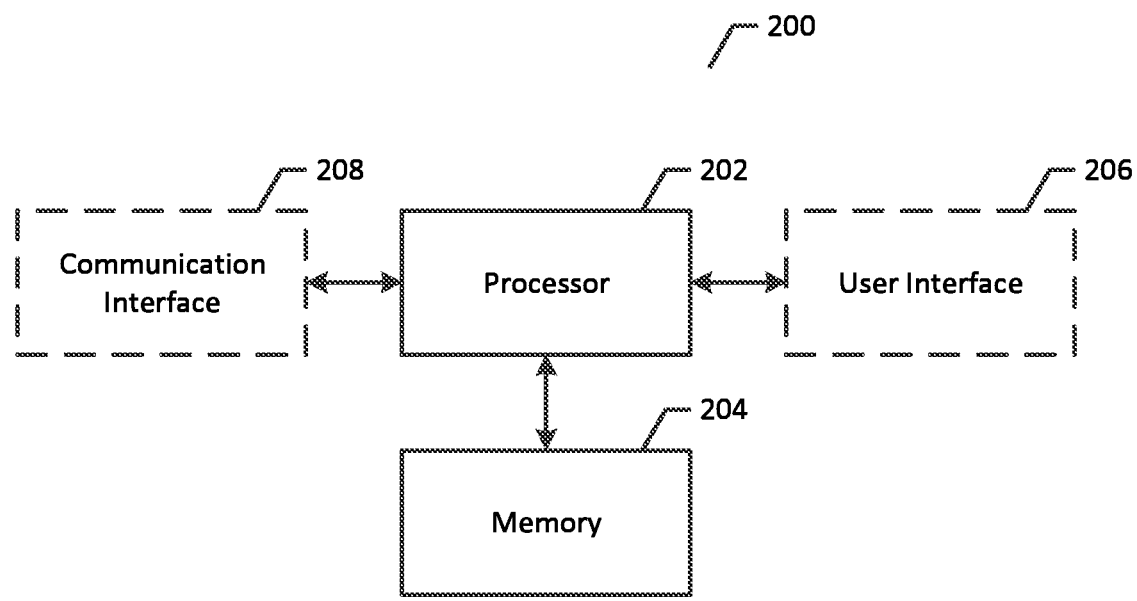
Figure 3:
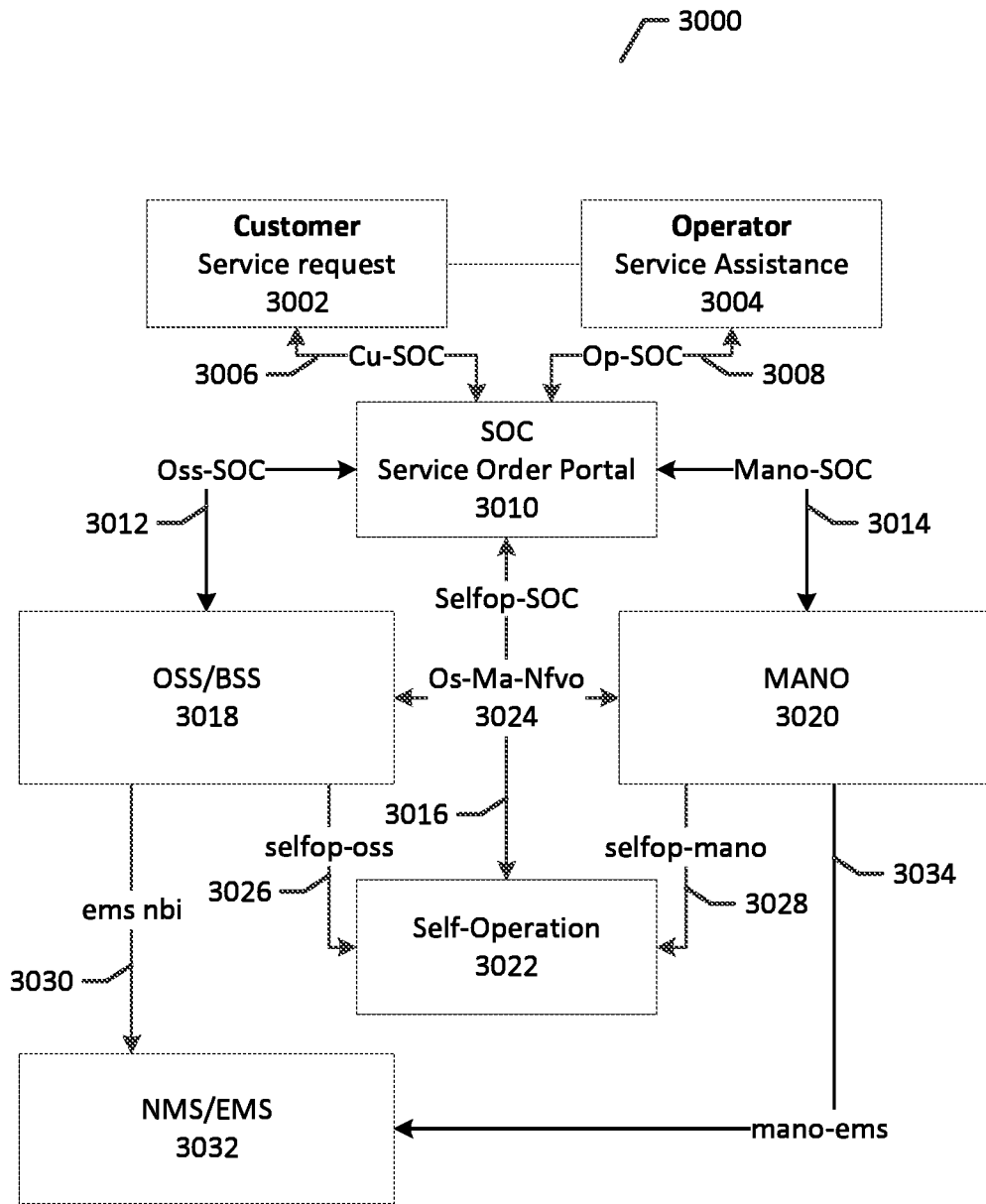
Figure 4A:
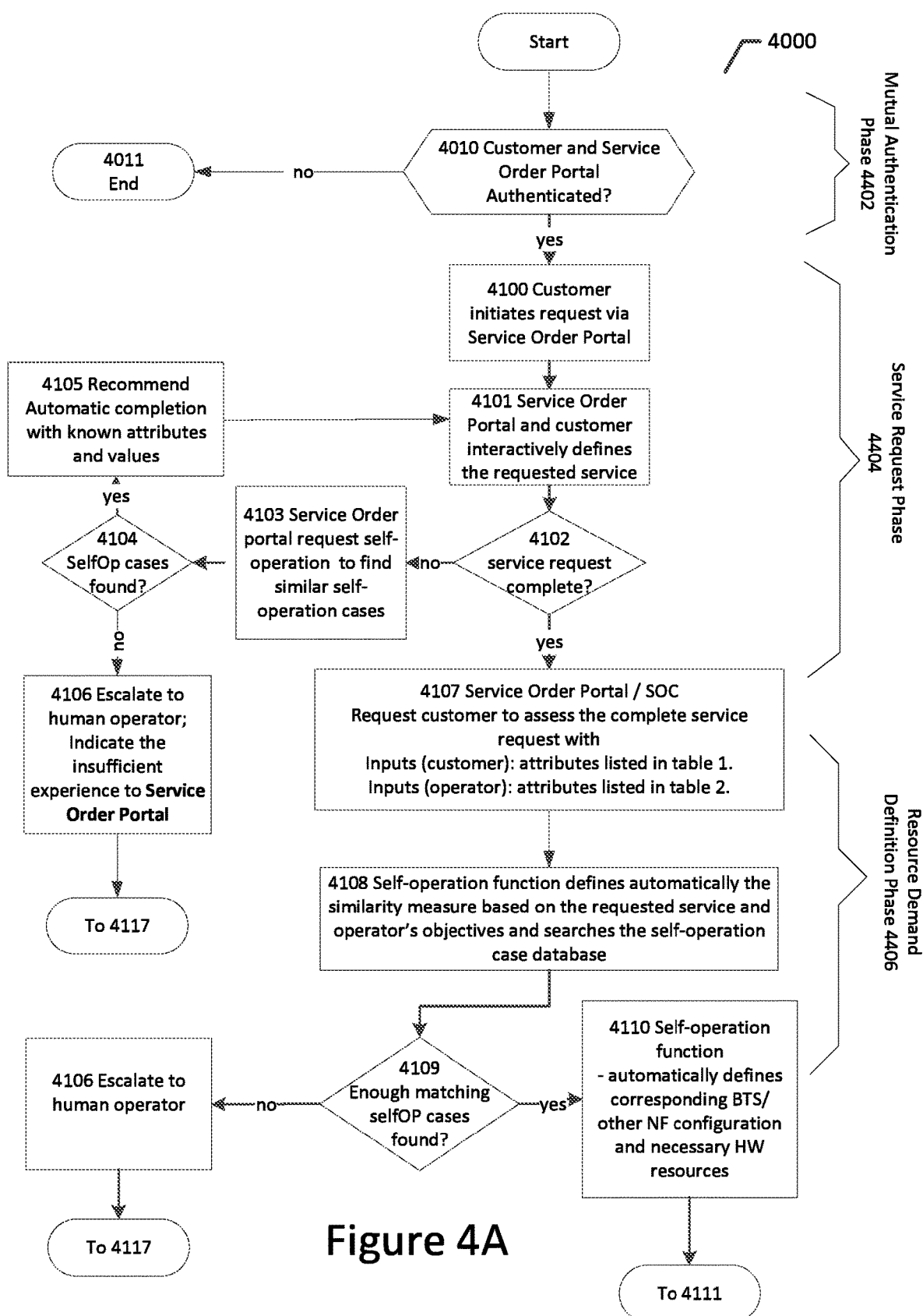
Figure 4B:
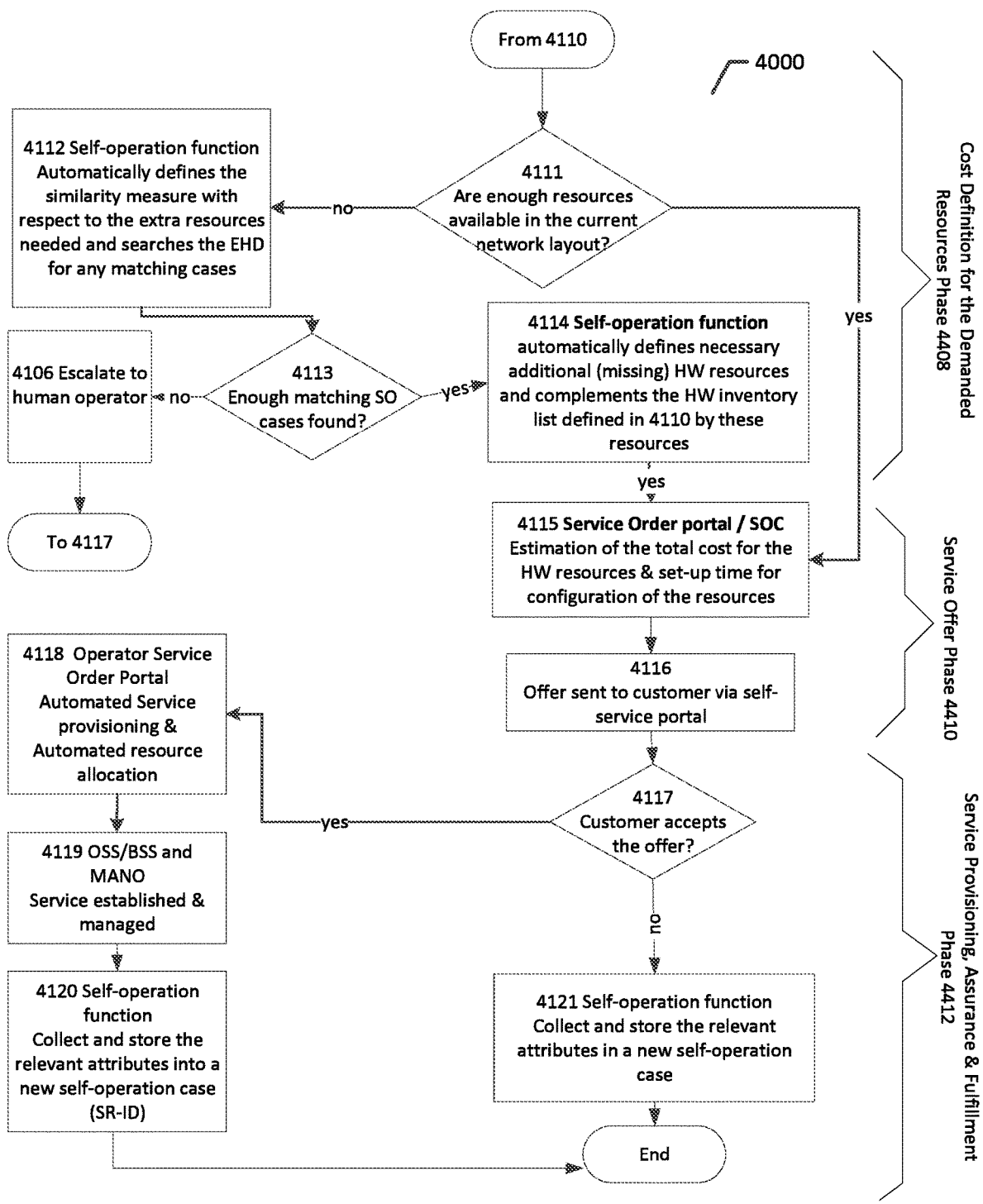

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a block diagram of a portion of an example system environment in which implementations in accordance with an example embodiment of the present invention may be performed;

FIG. 4a is a process flow diagram that illustrates aspects of an example embodiment of the present invention;

FIG. 4b is a continuation of the process flow diagram of FIG. 4a and illustrates aspects of an example embodiment of the present invention.

Figure 5:
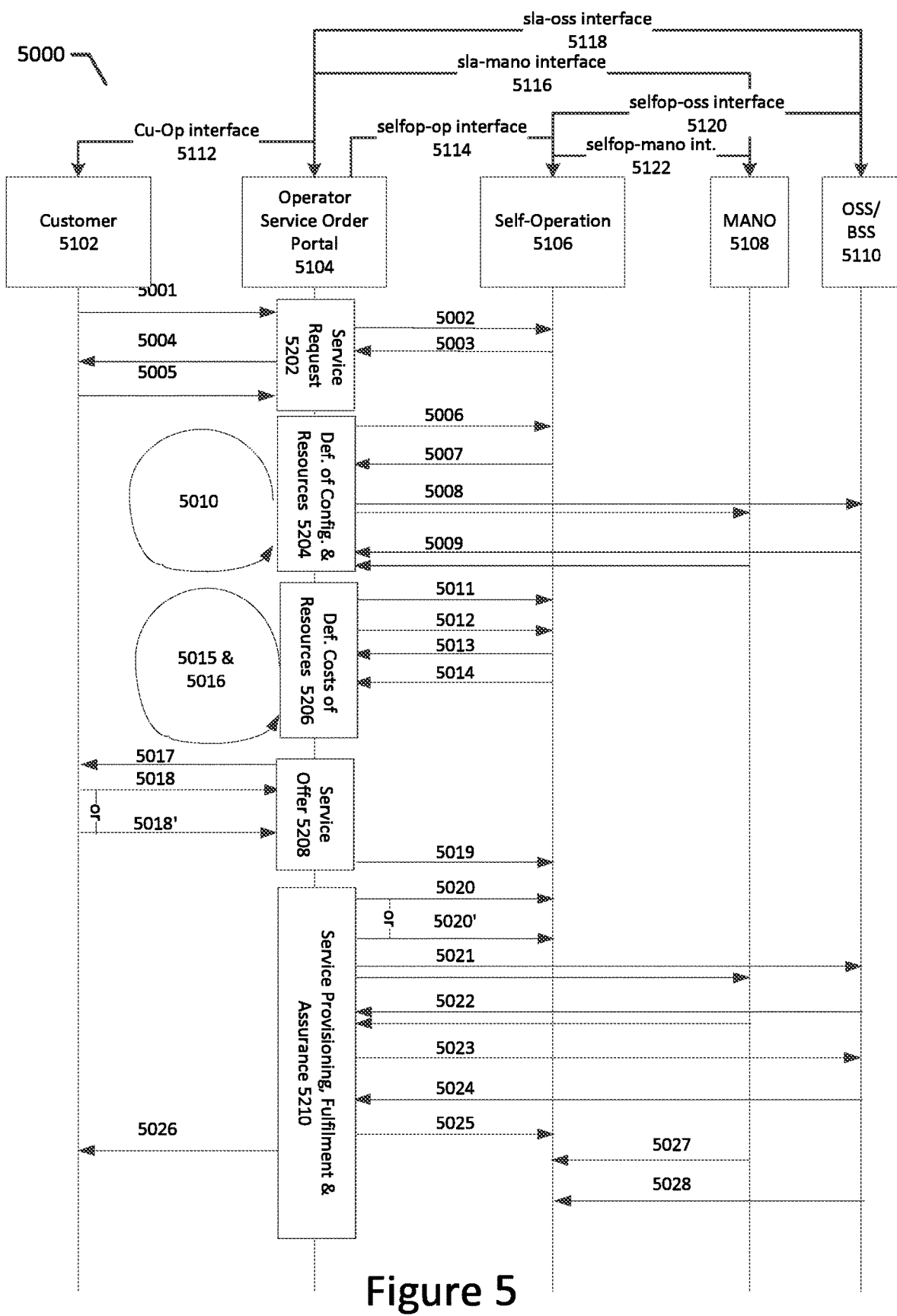
Figure 6:
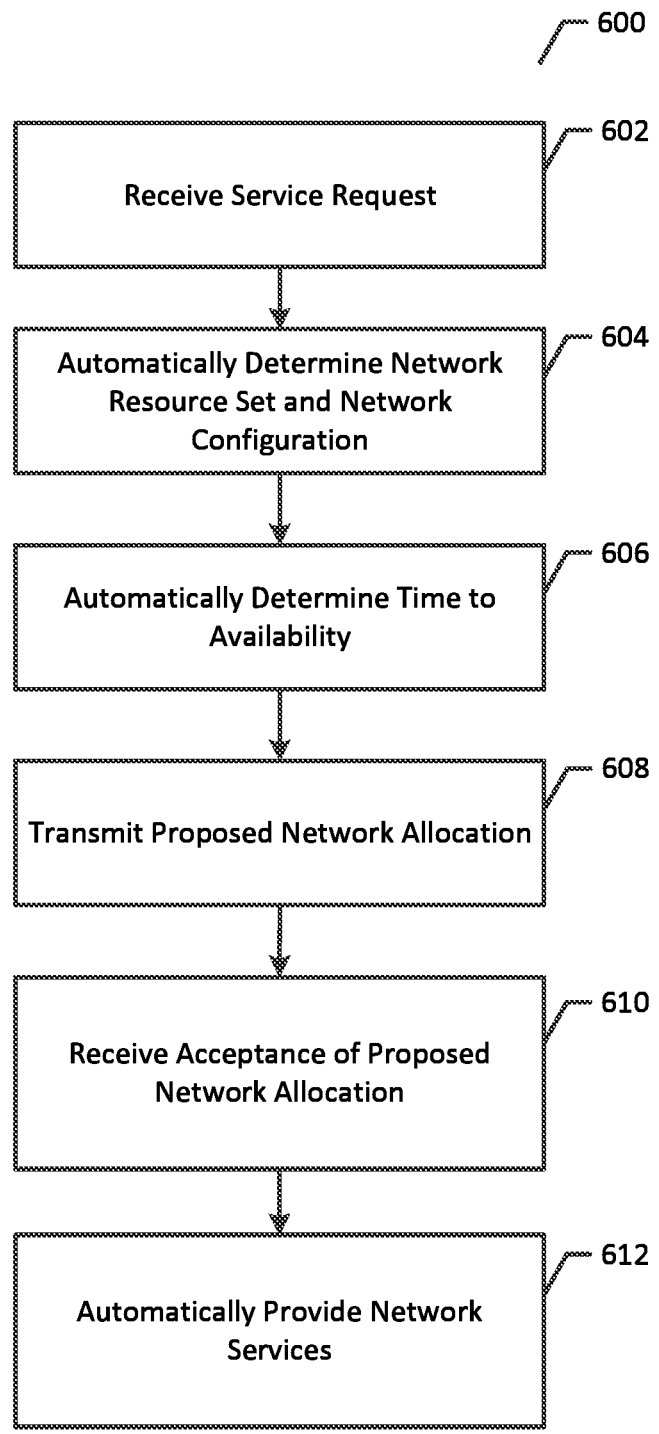

FIG. 5 is a message flow diagram that illustrates aspects of an example embodiment of the present invention; and FIG. 6 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to provide for the automatic requisition, definition, and provision of particularized network services based on user-specific requirements. Many implementations of example embodiments of the invention described and otherwise disclosed herein are directed to solving the technical challenges automatically establishing particularized network access and usage protocols for devices and application and automatically providing network access and resources in accordance with such protocols.

Recently, the service requirements associated with communications networks, including but not limited to wireless and/or mobile networks, have been increasing, at least in the sense that ever-increasing numbers of users and user equipment devices are demanding and expecting ever-increasing user data rates, bandwidth, and other improvements in network performance. At the same time, the particularized demands on such networks are diverging and differentiating, due at least in part on the new applications and device types that have recently emerged. As a result, modern networks are increasing facing design requirements associated with the support of such various and disparate communication needs within the same network environment. For example, in addition to traditional user equipment devices, some modern networks may need to accommodate traffic associated with Internet of Things (IoT) devices, public safety devices and protocols, network-connected cars and other vehicles (including but not limited to the traffic associated with vehicle-to-vehicle (V2V) communications, for example), and/or UHD (4k) video streaming (such as may be provided by Netflix, YouTube, and/or other content providers), each of which tends to have different functional requirements with respect to network configuration and performance.

In some situations, network slicing concepts, such as those defined in the NGMN 5G white paper, have been contemplated in connection with the development of networks. Some such network slicing concepts involve an interface from the end-to-end management and orchestration (MANO) layer to build dedicated network slices for an application, and/or to map an application to existing network slices. According to some such concepts, the MANO entity may define the network slices for a given application scenario, chain the relevant modular network functions, assign the relevant configurations to pursue the required performance, and finally map all of this onto the infrastructure resources.

It will be appreciated that the NGMN 5G white paper provides the following definition: 5G slice is composed of a collection of 5G network functions and specific RAT settings that are combined together for the specific use case or business model. Thus, a 5G slice can span all domains of the network: software modules running on cloud nodes, specific configurations of the transport network supporting flexible location of functions, a dedicated radio configuration or even a specific RAT, as well as configuration of the 5G device.

It will be appreciated that there are other approaches that may be used in automating the lifecycle management of services within a given network. For example, service orchestration provides an approach to automating the lifecycle management of services in the network. In a 5G network, for example, service orchestration may be an important part of the MANO entity. In some such situations, its main task is related to service fulfillment as it translates the requirements and objectives given by the customer in a service request and decisions and/or other parameters given or otherwise established by the operator as a response to the request (which may involve forming the basis for a service level agreement (SLA), for example) into network function configurations. It may also convey requests to a network orchestrator to allocate resources (for example, physical network functions (PNFs) and/or to instantiate these functions in the network function virtualization infrastructure (NFVI)) for the implementation of the service.

Service orchestration may also be responsible for end-to-end service delivery across the network, not just within a single physical or virtual network domain. In some such situations, service orchestration may need to be supported by service fulfillment and assurance. However, it will be appreciated that some technical challenges associated with service orchestration are implicated by the general lack of a fixed, standardized architectural definition and/or solution that allows for the fully automatic creation and provisioning of a service in a modern network environment.

In some contexts, the service may be typically defined to be launched in a certain area of the network. For example, in a relatively simplified case, this would mean that a group of individual cells (such as may be used, for example, in connection with providing network resources for IoT devices, such as stable remote sensors, for example), that share approximately the same network properties and characteristics (such as may be case when the cells are very similar with respect to network context, for example). It will be appreciated that, in such situations, a network service may be readily configured to fulfill the typical requirements of a relevant SLA.

Additional technical challenges associated with service fulfillment may arise in more complex scenarios. For example, UHD video streaming on an any-time, any-location and/or other such more complex network resource-intensive activities tend to set more difficult requirements for the service fulfillment. Such requirements, and their associated technical challenges may be compounded with when mobility is required, and is further compounded when the service is required to provide equal and/or near-equal QoS/QoE across a wide range of locations. In most network environments, it is unlikely that all of the surrounding cells in a given area would share exactly the same network characteristics and/or capabilities. In some such situations, and in order to achieve the required performance metrics defined by the relevant SLA, the cells may have to be configured slightly differently (such as on a cell-by-cell basis, for example) depending on their environment and context. To address such situations, some approaches involve categorizing and analyzing cells according to their context.

As the complexity of the network environment, resource needs, and/or other factors increases, so too do the technical challenges associated with providing network service in accordance with the requirements of a relevant SLA. For example, some applications, devices, and other network uses involve situations where there are several services allocated in the same network slice. In some such situations, technical issues arise in balancing and/or otherwise establishing compromises in configuring the network functions in order to find an optimal and/or otherwise acceptable configuration and/or settings group that supports the multi-service operations.

In addition to technical challenges that are associated with the complexity of the particular application(s) and/or device(s) implicated in a given scenario, technical challenges are also inherent in the management and allocation of network capacity. For example, one of the significant challenges that network operators face, including but not limited to operators of networks that involve a telecommunications cloud aspect, involves the allocation of physical, virtual, and/or other network resources to various network functions in order to establish the service defined in a relevant SLA.

In some situations, service assurance provides means to monitor and/or otherwise confirm that certain network functions are operated according to the specific operator objectives (which may be reflected in an SLA, for example) and that the services fulfil their requirements (such as requirements for the targeted quality, reliability, latency, security, throughput, connectivity, and the like, for example). In some such situation, as soon as the applications and/or services are performing according to the requirements and objectives and delivering optimal and/or otherwise acceptable performance metrics, it would be beneficial to identify and capture how the network functions have been configured, and store this information (such as an identification of the activated features, analytics and SON functions, CM parameter values, and the like, for example) as a reference for the future. It will be appreciated that in many conventional situations, correlations between the CM and PM may be missed and/or wasted, particularly where there has been no means to collect and store such information for use in the future. Similarly, it may be advantageous to ascertain and capture the HW resource allocations needed for different types of network functions, particularly in situations wher such resource allocations may represent valuable information in future operations.

Additional technical challenges have traditionally arisen in situations involving multiple networks. In will be appreciated that, in some situations, two networks may be compared as two separate, complete entities such that the two networks in their operations are different from each other. Moreover, initial differences between the two networks may be increased with the introduction of additional heterogeneous accesses and networks. In some situations that involve proposed 5G networks, it is possible that a part of one or more networks may be relatively dynamic, where certain network instances can be created and removed on demand frequently during network operations. However, it will be appreciated that, when looking at the individual network elements, functions, and their relations (such as interoperability considerations, for example), there may be multiple similar elements, functions, and relations in the networks.

In an example context involving cellular radio cells within one or more networks, it may be possible to identify cells with at least some similar characteristics, such as cells of the same technology, same frequency band, same cell type (such as macro, or example), same antenna mode (such as n-sector directional, for example), similar traffic pattern (such as cell load level, average number of active UEs (user equipment), for example, and the like. Similarities with respect to the relations between cellular radio cells may also be identified, including but not limited to the neighbor relations of, for example, Macro-Macro, Macro-Micro, and the like, for example. Similarities concerning the functions and their relations to the network elements may also be identified, including but not limited to the similar intra-RAT MRO functions that optimize the handover thresholds and parameters of Macro-Macro cell pairs, for example. It may also be possible to identify one or more similar inter-RAT MRO functions that optimize the handover thresholds and parameters of Macro-Micro cell pairs, for example. Similarities between and/or amongst cells with respect to the similar traffic steering functions that decide on the off-loading or on-loading of traffic between Macro cells and Wi-Fi APs (Access Points) may also be identified, for example. It will be appreciated that these, and other examples of one or more similarities at the level of network elements, functions and their relations, may be identified in connection with one or more networks and/or portions of networks.

In some situations, it may be advantageous to identify similarities in the nature and/or characteristics of one or more network elements, functions, and/or their relations in proposed and/or potential 5G networks and/or networks that incorporate 5G-related aspects. For example, while some 5G networks may allow for specific network slices and radio access to be created and removed on demand and/or dynamically, the network slices and access still may use pre-defined type(s) of networking technology (including but not limited to its protocols, for example), pre-defined type(s) of RAT(s), pre-defined cell type(s), pre-defined type(s) of antenna mode(s), pre-defined type(s) of networking function(s), pre-defined type(s) of operational function(s), and/or the like. Even in situations where a specifically created network slice and access may have been removed, the operation experiences associated with that particular slice and/or access may still be applicable to another requested network slice and access if their realizations share the same or similar types of pre-defined characteristics, and/or other characteristics.

In some such situations, and in other situations, self-operation may act as an intelligent function (such as a, self-operation function, for example) between a human operator and any other parts of the virtual and/or physical systems. For example, and based on the particular interface(s) associated with a given situation, a self-operation function can learn and construct operation experiences (which may be referred to as self-operation cases, for example) from the operations of the relevant systems. Consequently, self-operation may provide the recommendations to the system operations based on its learned and imported experiences when system operations are similar to certain experiences known by self-operation function.

In many networks conforming to 5G concepts and/or protocols (and in many networks that include network portions involving 5G concepts and/or protocols), it may be beneficial to allow a customer (such as a service requestor, and/or and MVNO/tenant, for example) to create an SLA automatically together with a network operator (such as an infrastructure owner, for example). In some such situations, after the SLA has been mutually agreed upon, it would be beneficial if an automatic service orchestration could enable the provisioning of the relevant service according to the SLA. However, conventional approaches do not provide for the automatic definition of an SLA. Moreover, conventional approaches do not provide for the automatic mapping of the relevant SLA to a service orchestration such that the relevant and/or otherwise required service can be provisioned accordingly. In particular, it would be advantageous in many situations if interfaces providing for such automated service order processes and/or processing were available. It may also be beneficial to provide for the automatic capture and subsequent application of experiences associated with previous SLA definitions and service provisioning.

As such, many example embodiments of the invention described and/or otherwise disclosed herein are directed towards solving the aforementioned technical issues and addressing the aforementioned needs in the art such that the workflow from service request to service provisioning can be realized automatically and the corresponding experiences can also be learned and applied in subsequent instances.

Some example embodiments of the invention described and/or otherwise disclosed herein provide solutions that automatically request, define, and provision a service within a network environment. In some example implementations of such embodiments, such solutions may involve the receipt of a corresponding (but possibly incomplete) set of initial requirements from a customer. In some such example implementations, the automation effected by aspects of embodiments of the invention is enabled by new network entities which may be referred to as a service order portal and/or a self-operation, which may be used in conjunction with the new interfaces between the service order portal and other network entities (such as self-operation, OSS/BSS, and MANO, for example). In some example implementations, a service order portal entity may be positioned in a SOC (Service Operations Center), while a self-operation entity may provide the portal with the corresponding historical experiences of service requesting, definition, and provisioning (and may also learn the new relevant experiences information). As such, some example implementations of embodiments of the invention described and/or disclosed herein involve the definition of a new architecture and a new procedure to automatically define and provision a service within a network environment.

It will be appreciated that, in addition to overcoming the technical challenges discussed above, some embodiments of the invention described and/or otherwise disclosed herein provide further benefits that may be advantageous in one or more particular situations. For example, in many conventional situations, it can take a very long time for a customer and the network operator to define and agree on the particular service terms to be included in an SLA, particularly those terms and parameters associated with the particularized, customer-specific network resource needs. Moreover, the conventional approach to the development of an SLA is typically and offline process that is unlikely to meet and/or otherwise conform to the service requirements associated with 5G networks. As such, some example implementations of embodiments of the invention described and/or otherwise disclosed herein involve the automatic definition of one or more customer service requests and the corresponding SLA, in a manner that may be performed interactively and online between a customer and a network operator. Some such example implementations also involve a response to a service request in cases when one or more aspects of the service request may not be recognized as feasible in a given network environment. In some such example implementations, compromises, changes, and/or other changes may be suggested and/or recommended in the course of the automatic creation of the SLA and its underlying parameters.

It will also be appreciated that, in some conventional contexts, a network service operator may define certain blueprints and/or templates aimed toward the realization of specific SLAs in advance, such that specific network services and their pre-defined configurations can be readily provisioned to the network and/or relevant network slices when the very services are requested. However, these pre-defined blueprints and/or templates, along with their corresponding SLAs, can be very limited and often cannot guarantee to meet a given particular service request from a customer. Moreover, such static blueprints and/or templates, and their corresponding SLAs, often cannot meet the service requirements of 5G networks, particularly to the extent that any specific customer requests and services (which are often dynamic in nature, for example) must be supported automatically and precisely. To address this need and its related technical challenges, some example implementations of embodiments of the invention described and/or otherwise disclosed herein realize the services (regardless of the dynamic and/or static nature of the requested services) of any customer-specific SLAs automatically.

It will further be appreciated that, in many network environments, the available network resources of 5G networks are expected to be highly time-varying and dynamic. This time variance and dynamism raises technical challenges associated with the agreement for and subsequent provision of specific 5G network services according to certain pre-defined blueprints and/or templates. As a preliminary matter, when there are not enough network resources available for a service at a given time, corresponding extra resources may need to be added. Further, many conventional approaches based on pre-defined blueprints and/or templates cannot identify the time needed before extra resources would need to be made available and/or the associated prices and/or other costs associated with adding such resources in a specific case. As a result, failures may occur, at least in the sense that the services actually provided in a given situation may not fulfill the requirements established under a particular SLA. Similarly, many conventional approaches based on pre-defined blueprints and/or templates cannot tell the time needed to assign the part(s) of available resources to a given service and/or the associated price and/or other costs for the assigned resources. In contrast, some example implementations of embodiments of the invention described and/or otherwise disclosed herein can identify the time needed before the extra resources would be made available and the associated prices and/or other costs associated with adding them in the case of insufficient resources by capturing and applying relevant corresponding historical experiences. Some such example implementations also involve determining the time needed to assign the available resources to a service and the associated prices and/or other costs associated with the assigned resources. As such, some example implementations of embodiments of the invention described and/or otherwise disclosed herein provide for combining such determined costs and providing estimated and/or actual prices and/or other costs associated with the service provisioning necessary in a particular situation, including but not limited to, for example, a dynamic network environment. It will be appreciated that some example implementations of the invention described and/or otherwise disclosed here allow for the incorporation, extension, updating and/or other use of predetermined blueprints and/or other templates, including but not limited to the incorporation of such blueprints and/or other templates in connection with the generation of an SLA and/or the provision of certain services within a given network environment and/or context.

As discussed herein, many example implementations of embodiments of the present invention provide for the reduction and/or elimination of network inefficiencies and/or service failures associated with conventional approaches to the development of an SLA and the related allocation of network services aimed towards fulfilling the requirements of a given user. In particular, some example implementations of embodiments of the invention contemplate solutions that automatically request, define, and provision a service within a network environment. In some example implementations, such solutions may involve the receipt of a corresponding (but possibly incomplete) set of initial requirements from a customer, and automation effected by a service order portal, a self-operation, and/or related interfaces with other network entities.

While the method, apparatus and computer program product of an example embodiment may be deployed in a variety of different systems, one example of a system that may benefit from the procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems.

In addition to the more traditional types of user equipment 102 which may be present within a given system environment, system environment 100 also includes one or more Internet-of-Things (IoT) user equipment devices 110, which may be referred to as IoT devices. Although the IoT device may be configured in a variety of different manners, the IoT devices 110 may be embodied as cellular IoT (C-IoT) devices, narrowband IoT (NB-IoT) devices, and/or other IoT devices, including but not limited to vehicles, appliances, mechanical equipment, HVAC equipment, wearable devices and/or other devices that have been configured to allow for communications and/or other interactions with a network environment.

System environment 100, as depicted in FIG. 1, also includes one or more access points 104a and 104b, such as base stations (such as node Bs, evolved Node Bs (eNB), or the like, for example). A cellular access point, such as a base station, may define and service one or more cells. The access points may, in turn, be in communication with a network 106, such as a core network via a gateway, such that the access points establish cellular radio access networks by which the user equipment 102 and/or IoT devices 110 may communicate with the network. The system environment 100 of FIG. 1 may include a plurality of different cellular radio access networks including, for example, a 5G radio access network, an LTE radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 and/or IoT device 110 moves from an area serviced by access point 104a to an area serviced by access point 104b, the user equipment 102 and/or IoT device 110 is able to access the network 106 via a radio access network provided by the same vendor across access points. Although not shown, the system may also include a controller associated with one or more of the cellular access points, (such as base stations for example), so as to facilitate operation of the access points and management of the user equipment 102 and/or IoT device 110 in communication therewith. As shown in FIG. 1, a system may also include one or more wireless local area networks (WLANs), each of which may be serviced by a WLAN access point 108 configured to establish wireless communications with the user equipment 102 and/or the IoT device 110. As such, the user equipment 102 and/or the IoT device 110 may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In connection with the approaches to automatically request, define, and provision a service within a network environment, some example implementations of embodiments of the invention disclosed and/or otherwise described herein contemplate the use of network entities such as a service order portal and/or a self-operation, which may be used in conjunction with interfaces with other network entities. In this regard, automatically requesting, defining, and provisioning a service within a network environment can be accomplished by an apparatus 200 as depicted in FIG. 2. The apparatus may be embodied by and/or incorporated into one or more UEs, such as user equipment 102, IoT device 110, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more network elements and/or functions.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (such as a computer readable storage medium, for example) comprising gates configured to store data (such as bits, for example) that may be retrievable by a machine (such as a computing device like the processor, for example). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (such as chips, for example) including materials, components and/or wires on a structural assembly (such as a baseboard, for example). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (such as by being physically embodied in circuitry, for example) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (such as a pass-through display or a mobile terminal, for example) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (such as software and/or firmware, for example) stored on a memory accessible to the processor (such as memory device 204, and/or the like, for example).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As noted herein, many implementations of example embodiments of the invention described, contemplated, and/or otherwise disclosed herein are directed to solutions that automatically request, define, and provision a service within a network environment, including but not limited to solutions that involve a service order portal, a self-operation, and/or related interfaces with other network entities. As such, some example implementations are presented below to clarify how aspects of such example embodiments may be advantageous in certain situations. It will be appreciated that, while many of the following examples refer to a specific network entities and identify certain operations that may be performed by such network entities, it should be appreciated that such references are done for the purposes of clarity, and example implementations conforming to those examples presented herein and/or otherwise contemplated by the invention disclosed herein may be performed in connection with other network entities, alone or in combination with one or more additional network entities, without departing from the spirit and/or scope of the invention disclosed herein.

FIG. 3 is a block diagram of a portion of an example system environment 3000 in which implementations in accordance with an example embodiment of the present invention may be performed. As shown in FIG. 3, example environment 3000 includes several network entities, namely, customer service request 3002, operator service assistance 3004, service order portal 3010, operation support system/business support system (OSS/BSS) 3018, MANO 3020, self-operation 3022, and network management system/element management system (NMS/EMS) 3032. As shown in Figure, there, example environment 3000 also includes a number of interfaces, which are marked as Cu-SOC interface 3006, Op-SOC interface 3008, Oss-SOC interface 3012, Mano-SOC interface 3014, Selfop-SOC interface 3016, OS-Ma-Nfvo interface 3024, selfop-Oss interface 3026, selfop-mano interface 3028, ems-nbi interface 3030, and mano-ems interface 3034. While not explicitly shown in the example environment 300, an interface-D, which may be supported by InfoBus, for example, may be extended with selfop-oss interface 3026 and selfop-mano interface 3028. It will be appreciated that new entities, such a service order portal 3010 and self-operation entity 3022, along with the Cu-SOC interface 3006, Op-SOC interface 3008, Selfop-SOC interface 3016, Oss-SOC interface 3012, and Mano-SOC interface 3014 may be introduced into an ETSI (European Telecommunications Standards Institute) defined MANO architecture.

As shown in FIG. 3, the Service Order Portal entity 3010 may be considered to be a new entity implemented with hardware, software, and/or a combination of hardware and software. In some example implementations, along with with the similar historical experiences received from the Self-Operation entity 3022, the Service Order Portal entity 3010 may automatically define a service with the corresponding (but potentially incomplete or unconsidered, for example) initial requirements from a customer (which may be reflected in customer service request 3002, for example) and automatically provisions the required service. In some example implementations, the service order portal entity 3010 may also be responsible for and/or may be otherwise involved in operations related to SLA management, objective management, and business management considerations associated with a service request and the automatic provision of services, such as network services aimed toward fulfilling a particularized service request, for example.

As shown in FIG. 3, the Self-Operation entity 3022 may be considered to be a new entity implemented with hardware, software, and/or a combination of hardware and software. In some example implementations, the Self-Operation entity 3022 supports the Service Order Portal entity 3010 by finding and recommending service configurations and/or other service parameters based, for example, on historical experiences that may be associated with situations similar to a given service request and/or service provisioning pending before the Service Order Portal entity 3010. In some example implementations, the Self-Operation entity 3022 also learns the further experiences associated with a current service request and the result of its service provisioning.

As shown in FIG. 3, the Customer Service Request entity 3002 is an entity that may be implemented with hardware, software, and/or a combination of hardware and software. In some example implementations, it enables (1) the mutual authentication between a customer and a network service operator and (2) the needed customer interactions throughout the service request and fulfillment process, which may extend, in some example implementations, from an initial service request to the fulfillment of the agreed service, for example.

Example environment 3000 also includes the operator service assistance entity 3004, which may be implemented with hardware, software, and/or a combination of hardware and software. In some example implementations, it enables the network service operator to provide inputs such as an operator's policies, business objectives or other guidance for the evaluation of the feasibility of the relevant service fulfillment from the operator's point of view.

As noted above, example environment 3000 also includes a Cu-SOC interface 3006. As shown in FIG. 3, this interface connects the Customer Service Request entity 3002 to the Service Order Portal entity 3010. In some example implementations, the customer and/or other requestor of network services may need to provide inputs such as the objectives and/or other requirements to the service definition. Upon submission of such objectives and/or other requirements, which may be passed from the customer service request entity 3002 to the service order portal entity 301, the customer and/or other requestor may be passed a Service Offer, which may include, for example, the relevant hardware (HW) inventory list, cost estimation and time needed for setting up the service. Upon acceptance of the service offer, the service may be automatically provisioned.

As noted above, example environment 3000 also includes an Op-SOC interface 3008. As shown in FIG. 3, this interface connects the Operator Service Assistance entity 3004 (of the network service operator, for example) to the Service Order Portal entity 3010. In some example implementations, the operator may provide inputs such as operator's policies, business objectives or other guidance for the evaluation of the feasibility of the service fulfillment from the operator's point of view, which may be passed via the Op-SOC interface to the service order portal entity 3010.

As noted above, example environment 3000 also includes a selfop-SOC interface 3016. As shown in FIG. 3, this interface connects the Self-Operation entity 3022 to the Service Order Portal entity 3010. In some example implementations, the Self-Operation entity 3022 may provide corresponding historical experiences to complement the service requests with more accurate and/or more suitable SLA attributes. In some example implementations, the self-operation entity 3022 may also pass, to the service order portal entity 3010 via the selfop-SOC interface 3016, recommendations directed to the configuration of network elements and functions in a way that would tend to cause service fulfillment to be successful, at least in the sense that the requirements of a given SLA with respect to a particular user and/or request would be fulfilled. In some example implementations, information that may assist in the definition of the necessary HW resources and their possible setup times may be passed via the selfop-SOC interface.

As noted above, example environment 3000 also includes an Oss-SOC interface 3012. As shown in FIG. 3, this interface connects the OSS/BSS entity 3018 (which, in some example implementations, is associated with customer and service management, network and/or network slice planning, service fulfillment and assurance, and/or billing considerations, for example) to the Service Order Portal entity 3010. In some example implementations, the Oss-SOC interface may be used to pass a request for information regarding the relevant PNF resources (such as an installed HW base, for example) in the current network layout or network slice, and to pass the requested information back. In some such example implementations, such information may be needed in order to allow a network entity such as the service order portal entity 3010, to estimate the available capacity and/or available resources, such as the capacity and/or available resources in a relevant traditional telcommunications network, for example. In return, the configurations of the PNFs and VNFs (which may, for example, be recommended by the Self-Operation entity 3022, may be provisioned to the NMS via Oss-SOC interface 3012. Alternatively, communication between the NSM/EMS entity 3032 (which may associated with PNFs and VNFs and/or associated with VI considerations, for example) and the OSS/BSS entity 3018 may be achieved through the operation of the ems nbi interface 3030.

As noted above, example environment 3000 also includes a Mano-SOC interface 3014. As shown in FIG. 3, this interface connects the MANO entity 3020 (which may, in some example implementations, be involved with network slicing orchestration, service orchestration (such as may be associated with PNF/VNF and/or related considerations, for example), network orchestration, NFVI resource management, and/or data center management, for example), to the Service Order Portal entity 301. In some example implementations, the Mano-SOC interface 3014 may be used to allow the Service Order Portal entity 3010 to request information of the VNF resources (such as virtual platform resources and/or optionally also DC HW resources, for example) in the current network layout or network slice. In some such implementations, this information may be needed in order to be able to estimate the available capacity and/or other available resources in a telecommunications cloud, for example. In return, the instantiation of needed VNFs and the allocation of necessary PNFs can be commanded via this interface to the service and resource orchestration, for example. As shown in FIG. 3, the MANO 3020 may also communicate with the NMS/EMS entity 3032 via a mano-ems interface 3034, and with the OSS/BSS entity 3018 via an OS-Ma-Nfvo interface 3024.

As noted above, example environment 3000 also includes a selfop-oss interface 3026. As shown in FIG. 3, this interface connects the OSS/BBS entity 3018 with the self-operation entity 3022. In some example implementations, this interface may be considered to extends an Interface-D. In some such example implementations, and in other example implementations the selfop-oss interface may be used to complement the collection of experiences regarding the CM, PM and FM data for PNFs with the collection of the corresponding information of the HW resources necessary for running one or more relevant network elements and/or functions.

As noted above, example environment 3000 also includes a selfop-mano interface 3028, which connects the self-operation entity 3022 with the MANO entity 3020. In some example implementations, this interface may be considered to be an extension of an Interface-D with a new type of data collection. In some example implementations of selfop-mano interface 3028, the interface is used in connection with the collection and storage of one or more VNFs' virtual platform resources as experience into the relevant self-operation cases.

FIGS. 4a and 4b are complementary parts of a process flow diagram that illustrates aspects of an example embodiment of the present invention. As shown in FIG. 4, process flow 4000 depicts an example procedure which may be used to automatically define and provision a service in accordance with example embodiments of the invention described and/or otherwise disclosed herein.

As discussed herein, some example implementations of embodiments of the invention provide and/or otherwise propose a procedure that may be used to define a service and provision it automatically. Process flow 4000 depicts one such procedure, which may be used in connection with the example environment 3000 and the architecture reflected therein.

In general, and as shown in FIG. 4, it may be convenient to consider process 4000 as involving six general phases: a mutual authentication phase 4402, a service request phase 4404, a resource demand definition phase 4406, a cost definition for the demanded resources phase 4408, a service offer phase 4410, and a service provisioning, assurance, and fulfillment phase 4412.

Upon starting at block 4001, process flow 4000 proceeds to block 4010, where a Customer Service Request entity and a Service Order Portal entity authenticate each other. Any approach to mutual authentication between a customer service request entity and a service order portal entity may be used in example implementations of block 4010. In situations where authentication fails, process 4000 proceeds to block 4011, and ends. In implementations where the customer service request entity and the service order portal entity have authenticated each other successfully, the automatic service definition contemplated by process 4000 starts when, as shown at block 4100, the Service Order Portal entity receives a service request from a customer, which may be received, for example, via a Cu-SOC interface. In some example implementations of block 4100, the customer may provide some of the known requirements to the Service Order Portal entity. In some such example implementations, and as shown in FIG. 4, a corresponding service request instance may created and assigned (by the Service Order Portal entity, for example) with a unique Service Request ID. In some example implementations, this ID can be used to identify the particular service request throughout the definition and provisioning process.

As shown in FIG. 4, process 4000 may then proceed to block 4101, where the service order portal entity and the customer may interactively define the service requested and/or otherwise required by the customer. As shown at block 4102, part of this process involves determining whether the requirements received from the customer are complete. If the requirements from the customer are not complete, process 4000 may proceed to block 4103, where the Service Order Portal entity may send a request via a Selfop-SOC interface to the self-operation entity that the self-operation entity find similar self-operation cases and extract the complete service requirements for the corresponding service from the matching self-operation cases. As shown in FIG. 4, in some example implementations, process 4000 may proceed to block 4104, where the self-operation entity may determine whether any similar and/or otherwise relevant prior cases have been found. If no such cases are found, process 4000 may proceed to block 4106, which, in some example implementations, involves escalation to a human operator to help the customer to complete the service request. In some example implementations of block 4106, an indication of insufficient experience information may be passed to the relevant service order portal entity. After the escalation process in block 4106, process 4000 may transition to block 4117, which is described in more detail below.

In example implementations of blocks 4103 and 4104, in situations where similar and/or otherwise relevant prior cases have been located by the self-operation entity, information associated with such cases (such as the full requirements for the service in such cases, for example) may be automatically extracted. Then, as shown at block 4105, these automatically extracted requirements for the service (which may, for example, be a full set of requirements) are recommended to the customer for review via Cu-SOC interfaces. It will be appreciated that, with respect to the determination of whether a service request is complete or not (such as may be performed at block 4102), may be detected in connection with pre-defined rule(s). For example, a service request may be considered to be complete if it has provided the information to a minimum set of the predefined requirement attributes for the service, (such as an IoT service, for example). In example situations where no corresponding rule is pre-defined, the initial service request may be considered as incomplete by default.

If the customer accepts the recommendations sent via a Cu-SOC interface (such as in connection with block 4105, for example) or the full requirements have been defined by the customer (such as at block 4101, for example), process 4000 may proceed to block 4107, where a service order instance is created by Service Order Portal with the customer's complete requirements for the service and with the operator's guidelines and policies for the service provisioning. In some example implementations, this service order instance may be identifiable by the system with the Service Request ID throughout its life span.

In some example implementations of block 4107, the customer may be requested to assess the complete service request. In some such example implementations, this may involve customer inputs (such as those related to the list set out in Table 1 presented in the Appendix accompanying this disclosure, along with the attributes listed therein, for example) and/or operator inputs (such as those related to the list set out in Table 2 presented in the Appendix accompanying this disclosure, along with the attributed listed therein, for example). In many example implementations of block 4107, if the customer accepts the complete service request, the complete service request may be sent to a self-operation entity to find a feasible SLA for the corresponding requested service. However, in example implementations, where the customer rejects the complete service request, process 4000 may terminate.

As shown in block 4108, assuming that the customer accepts the complete service request, the Service Order Portal entity may then send the relevant service order instance to a Self-Operation entity via a Selfop-SOC interface and request that the self-operation entity find and/or otherwise identify the needed resources for such a service according to its former experiences. In some example implementations of block 4108, a Self-Operation entity automatically defines similarity measure based, for example, on the requirements and guidelines in the service order instance and then, searches for the matching self-operation cases in its self-operation database. As shown at block 4109, if an insufficient number of sufficiently similar and/or otherwise relevant prior cases are located by the self-operation entity, process 4000 may proceed to block 4106 (which is duplicated for clarity), which involves escalation to a human operator. In some such example implementations of block 4106, the human operator may assist with network planning and dimensioning, defining a corresponding BTS and/or other network function configurations, and/or define necessary HW resources that may be needed by the requested service, for example. Upon completion of the escalation procedures in block 4106, process 4000 may then proceed to block 4117.

If, at block 4109, enough matching self-operation cases are found, process 4000 may proceed to block 4110, where a Self-Operation function may automatically determines and/or define the corresponding BTS and/or other network functions (such as PNFs/VFNs, for example) and their configurations as well as their required HW/Virtual platform resources (such as computing, storage and networking resources, for example) according to the information in the matching self-operation cases. In some example implementations of block 4110, these determined resource demands (and, in some example implementations, their configurations, for example) may be identified with the Service Request ID and a reply to the Service Order Portal entity may be supplied via an Selfop-SOC interface.

As shown in FIG. 4 at block 4111, process 4000 involves determining whether there are enough available resources in the current network layout to satisfy the requirements of the requested service. In some example implementations this may be performed by a Service Order Portal entity that requests from both a MANO entity (such as via a Mano-SOC interface, for example) and an OSS/BSS entity (such as via an Oss-SOC interface, for example) to send information regarding the available resources in the networks. In some example implementations of block 4111, a MANO entity (such as via a Mano-SOC interface, for example) and an OSS/BSS entity (such as via an Oss-SOC interface, for example) reply with the currently installed and/or otherwise allocated resources (which may include, for example identifications of an installed PNF HW base, BTS type, allocated VNF platform resources, an installed DC HW base, server model, utilization rate, and/or the like, for example). Upon receipt of such information, the Service Order Portal entity may then calculate the volume (such as the number of BTSs per type and/or number of servers or racks per model, for example) of the resources that are needed to cover the demands associated with the relevant request and compares those demands them against the available resources.

As shown at block 4112, if there are not enough resources available, a Service Order Portal entity may ask (such as via a Selfop-SOC interface, for example) a Self-Operation entity and/or function to automatically define automatically a similarity measure with respect to the extra resources needed to fulfill the relevant service request and to search its self-operation database. As shown at block 4113, if the self-operation entity and/or function is unable to identify a sufficient number of matching and/or otherwise relevant cases, process 4000 may proceed to block 4106 (which is reproduced in FIG. 4 for the purposes of clarity), for escalation to a human operator. In some example implementations of block 4106, the escalation process may include network planning and dimensioning, assessment of the current network coverage and capacity, definition of missing HW resources, and/or may include taking action to implement the additional resources necessary to satisfy a particular request. As shown in FIG. 4, upon completion of the escalation process at block 4106, process 4000 may proceed to block 4117.

As shown at block 4114, if enough matching self-operation cases are found where the extra resources were successfully added earlier, the information associated with such prior cases (such as their needed setup time together with necessary volume of these resources, for example) may be extracted from the matching self-operation cases. In some example implementations of block 4114, the self-operation function may automatically define the necessary additional HW resources (which, in some situations, may be missing), and complements the HW inventory list which may have been developed in connection with block 4110 to include such additional HW resources.

Process 4000 may then proceed to block 4115, where a Self-operation entity may reply (such as via a Selfop-SOC interface, for example) to a Service Order Portal with the information reflecting the needed setup time, together with information reflecting the necessary volume and details of these resources. As shown at block 4115, a Service Order Portal entity may calculate the costs (such as a total cost and/or price, for example) of the needed resources (which may include, for example both available and, if any, missing resources). In some example implementations of block 4115, this may rely at least in part on an operator's pre-configured price information. In some example implementations of block 4115, the total time needed to make the service available (which may be referred to as TTA, or Time to Availability, for example) may be calculated. In some example implementations, this may involve a reply from a Self-Operation entity. It will be appreciated that, as shown in FIG. 4, in instances where sufficient resources are determined to be available at block 4111, process 4000 may proceed directly to block 4115.

Upon completion of the processes associated with block 4115, process 4000 may proceed to block 4116, where an offer associated with the requested service(s) is conveyed to the customer. In some example implementations of block 4116, a Service Order Portal entity provides an official Service Offer (which may include, for example, a Total Price and TTA for confirmation, for example), to the customer via a Cu-SOC interface. Process 4000 may then proceed to block 4117, where it is determined if the customer accepts the offer.

If, at block 4117, the customer accepts the Service Offer, process 4000 proceeds to block 4118, where an Operator Service Order Portal entity may convey requests to a MANO entity and a OSS/BSS entity to implement the automated service provisioning based on the corresponding BTS configuration templates and to make the automated resource allocation and instantiation of the VNFs via Mano-SOC and Oss-SOC interfaces. In some example implementations, this may involve the use of correlated Heat templates. As shown at block 4119, the MANO and OSS/BSS entities may take the corresponding actions to establish, manage, and monitor the service, which may involve, in some example implementations, regular and/or constant monitoring of one or more system metrics. In some example implementations, a Service Order Portal entity informs a Self-Operation entity that the service is provisioned. In some example implementations, this notification may be performed via a Selfop-SOC interface. As shown at block 4120, a Self-Operation entity may then collect, learn, and/or store the information associated with the service fulfillment performed in accordance to the SLA and/or the operator's objectives into a corresponding self-operation case. Process 4000 may then end.

If, at block 4117, the customer rejects the Service Offer, a Service Order Portal entity may inform the Self-Operation entity the rejection. In some such situations, as shown at block 4121, Self-Operation entity may then collect, learn, and/or store the information associated with the rejected service offer in accordance with the SLA and/or the operator's objectives into a self-operation case. In some example implementations, the Service Order Portal entity may also remove the Service Offer in this case. As shown in FIG. 4, process 4000 may then end.

It will be appreciated, as reflected in process 4000, some example implementations of embodiments of the invention described and/or otherwise disclosed herein contemplate escalation to a human operator and/or other entity, in situations where it is determined that there are not enough experiences and/or other relevant information existing in and/or accessible by a Self-Operation entity to use in connection with assessing and/or otherwise addressing a particular request.

FIG. 5 is a message flow diagram that presents an example message flow 5000 that illustrates aspects of an example embodiment of the present invention. As shown in FIG. 5, message flow 5000 involves the movement of messages between a customer 5102, a operator service order portal 5104, a self-operation entity 5106, a MANO entity 5108, and an OSS/BSS entity 5110. In some example implementations of message flow 5000, communication between the customer 5102 and the operator service order portal 5104 may be achieved via a Cu-Op interface 5112, communication between the operator service portal 5104 and the self-operation entity may be achieved via a selfop-op interface 5114, communication between the operation service order portal 5104 and the MANO entity 5108 may be achieved via an SLA-MANO interface 5116, communication between the operator service order portal 5104 and the OSS/BSS entity 5110 may be achieved via an SLA-OSS interface 5118, communication between the self-operation entity 5106 and the OSS/BSS entity 5110 may be achieved via a selfop-OSS interface 5120, and communication between the self-operation entity 5106 and the MANO entity 5108 may be achieved via a selfop-MANO interface 5122. However, it will be appreciated that other approaches to achieving and/or facilitating communication between network entities and/or functions may be used in example implementations of message flow 5000.

In some of the example implementations described in connection with FIG. 5 and message flow 5000 contained therein, reference is made to certain Tables. These tables are presented in the appendix accompanying this disclosure, and should be considered to contain examples of the items and/or information that may be used in connection with a particular aspect of an example implementation, and are not intended to foreclose the use of alternative and/or additional approaches and/or to otherwise restrict the scope of embodiments of the invention described and/or otherwise disclosed herein. Similarly, with respect to the code portions and/or pseudo-code portions reflected herein, such information is provided for the purposes of clarity and to provide example approaches that may be used in connection with example implementations of the invention. They are not intended to foreclose the use of alternative and/or additional approaches and/or to otherwise restrict the scope of embodiments of the invention described and/or otherwise disclosed herein.

As noted herein, FIG. 5 and example message flow 5000 is intended to describe an example implementation of a procedure in accordance with embodiments of the invention directed to the self-operation assisted requesting, offering, provisioning, and fulfillment of a service in a network environment. In general, and as reflected in FIG. 5, it may be convenient to consider message flow 5000 as incorporating five phases and/or stages: a service request phase 5202, a definition of configuration and resources phase 5204, a definition of the costs of the demanded resources phase 5206, a service offer phase 5208, and a service provisioning, fulfillment, and assurance for the SLA instance phase 5210. It will be appreciated that the descriptions included herein may be made in reference to the specific example message flows reflected in FIG. 5, and the definitions and applications of corresponding operational experiences. It will be appreciated that a session of the automatic service offering and provisioning may be initiated by a customer 5102 through sending a Service Request.

In some example implementations of message flow 5000, when a customer needs certain networking services, the customer 5102 may define a ServiceRequest, which may include the attributes defined in Table 1 (as set out in the Appendix to this disclosure). In some example implementations, the defined ServiceRequest is supported by the Service Order Portal entity 5104, and the customer 5102 may send the request to the portal, as shown in message 5001 in FIG. 5. In some example implementations of message 5001, the defined requirements prepared by the customer 5102 are often incomplete and may be made without reference to and/or association with any relevant corresponding operator requirements.

Upon receipt of message 5001, the Service Order Portal 5104 may create a unique ServiceRequestID for the ServiceRequest. In some such example implementations, and in other example implementations of message flow 5000, the Service Order Portal 5104 may also extract the customer's service requirements from the service request contained in message 5001, and collect them into an attribute which may be referred to as ServiceRequestPartial. The Service Order Portal 5104 may then send message 5002 to the Self-Operation entity 5106. In some example implementations, message 5002 include a request to define the complete service requirements that may be needed for the service request. In some such example implementations, message 5002 may include the attributes of the ServiceRequestPartial and ServiceRequestID.

Upon receipt of message 5002, the Self-Operation entitly 5106 may extract the attributes in the message. Self-Operation may then search its database for similar and/or otherwise relevant self-operation cases that may be stored in connection with Service Request Experience. In some example implementations, this may involve the use of a ServiceRequestPartial attribute where an event=ServiceRequest value is included. With the search, the Self-Operation entity 5106 may create a self-operation case and collect the extracted attributes from message 5002 and the search. In some example implementations, this type of self-operation case may be considered to be a self-operation case of a Service Request Experience, which may be defined as set out below, for example:

---
Type 1. Self-operation case for Service Request Experience
---

```
event = ServiceRequest
context = ServiceRequestPartial
action = search self-operation database
    // it searches the successful experiences collected in the self-operation
    cases of "Service
    // Request Experience." Those cases belong to the groupIDs that have
    successfully provisoned
    // the service. The successful provisioning of the service can be
    identified from the self-
    // operation case of "Experience of SLA Offer and implementation"
    under the same groupIDs.
result = ServiceRequirementComplete | "no experience"
    // result can be extracted from Message (3) and (3')
profile = NULL
groupID = ServiceRequestID
where,
    ServiceRequestPartial = $^{1..*}$(attribute, value)
    ServiceRequirementComplete = $^{1..*}$(attribute, value)
        // "attribute" is defined in Table 1
```

In some example implementations of message flow 5000, the Self-Operation entity 5106 may reply to the Operator Service Portal 5104 with message 5003. In some example implementations, message 5003 may include a found ServiceRequestComplete and ServiceRequestID. In example implementations where the self-operation entity 5106 was unable to identify information that may be used in connection with completing a service request, message 5003 may take the form of a "not experience" message for a given ServiceRequestID and/or another indication of a lack of relevant information to convey back from the Self-Operation entity 5106.

In example implementations of message flow 5003 where the service request was able to be completed, the Operator Service Portal 5104 may then as shown by message 5004, forward the found ServiceRequestComplete to the customer for decision. In some example implementations, message 5004 may include a ServiceRequestComplete object that is recommended to the customer 5102 as a complete service request, and may, in some such example implementations, include one or more of the attributes and/or values listed in Table 1 for a given ServiceRequestID.

If the customer 5102 accepts the proposed completed service request conveyed in message 5004, the customer 5102 may reply with message 5005. In some example implementations, message 5005 includes an acceptance of the recommended ServiceRequestComplete. Upon receipt of message 5005, the Operator Service Portal 5104 may start the service evaluation associated with the particular ServiceRequestComplete object. In some example implementations, the Operator Service portal 5104 may find the OperatorRequirement attribute or value associated with a given ServiceRequestComplete object. With them, the Operator Service Portal 5104 may then transmit message 5006, which includes, in some example implementations, a request to the Self-Operation entity 5106 a request to find the demanded resources to provide such a requested service.

In some example implementations, when the Self-Operation entity 5106 receives message 5006, the Self-Operation entity 5106 extracts the attributes in the message. The Self-Operation entity 5106 may then search its database for the similar self-operation cases of Service Order Experience. In some example implementations, this search may involve the use of a objects, attributes, and values, such as ServiceRequestComplete, OperatorRequirement, and event=ServiceOrder, for example. With some example implementations of such a search, the Self-Operation entity 5106 may create a self-operation case and collect the extracted attributes from message 5006 and the search.

This type of self-operation case may be considered to be a "Type 2" self-operation case of Service Order Experience, which may be defined below, for example:

---
Type 2. Self-operation case for Service Order Experience
---

```
Event = ServiceOrder
context = { ServiceRequirementComplete ∪ OperatorRequirement }
action = search self-operation database
    // it searches the successful experiences collected in the self-operation
    cases of "Service Order
    // Experience." Those cases belong to the groupIDs that have
    successfully provisioned the
    // service. The successful provisioning of the service can be identified
    from the self-
    // operation case of "Experience of SLA Offer and implementation"
    under the same groupIDs.
result = {*( NF, config), *( PNF, HardwareUsed ), *( VNF,
PlatformResourceAllocated ) }
    // the formerly used resources in the matching self-operation cases
profile = NULL
groupID = ServiceRequestID
where,
    NF = ID of physical/virtual network function instance
    PNF = ID of physical network function instance
    VNF = ID of virtual network function instance
    HardwareUsed = data center hardware resources and BTS hardware,
used for the physical network function instance
    VirtualPlatformResourcesAllocated = VMs, CPUs, Storage disk
                                space, Memory consumption, bandwidth
Config= configuration of the function instance
```

As shown in FIG. 5, the Self-Operation entity 5106 may reply with message 5007. In some example implementations, message 5007 includes attributes, values, and/or other information to be sent to the Operator Service Portal 5104 in the form of a found {*(NF, config), *(PNF, Hardware Used), *(VNF, PlatformResourceAllocated)} and ServiceRequestID. Upon receipt of message 5007, the Operator Service Portal 5104 may then send message 5008. In some example implementations, as shown in FIG. 5, message 5008 may include requests to the MANO entity 5108 and the OSS/BSS entity 5110 to report their respective currently available network resources. As shown in FIG. 5, the MANO entity 5108 and the OSS/BSS entity 5110 may reply, via messages 5009, to the Operator Service Portal 5104 with information related to their respective available network resources in the form of, for example, (installed PNF HW base and allocated VNF platform resorces vs. installed DC HW base). In some example implementations, as shown at message 5010, the Operator Service Portal may then calculate the AvailableResources value and/or the MissingResources value for the requested service ServiceRequestID. In some example implementations, this may take the form of virtual platform resources being translated to invention of data center HW resources, such that a ResourceDemand value may be expressed as the sum of data center HW resources and the resources associated with a BTS HW base for a given demand. In some such example implementations, the ResourceDemand may be compared to the reported available data center HW resources and BTS HW base of a current network layout. As such, it may be possible, in some example implementations, to calculate a MissingResources value as the difference between the AvailableResources value and the ResourceDemand value. In some example implementations, message 5010 may include an indication of there are enough resources available for a given ServiceRequestID (such as when AvailableResources is greater than and/or equal to the ResourceDemand value). In some other example implementations, the message 5010 may include an indication of a Missing Resources value with respect to a given ServiceRequestID.

Subsequently, the Operator Service Portal may send messages 5011 and 5012 to the Self-Operation entity 5106. In some example implementations, message 5011 may take the form of a request to Find a TTA for AvailableResources, if AvailableResources ≠ NULL, where TTA is the "time to availability." In some example implementations, message 5012 may take the form of a request to Find TTA for Missing Resources, if MissingResources ≠ NULL. It will be appreciated that TTA, AvailableResources and Missing Resources may be defined in accordance with the material presented in Table 4 (as included in the appendix to this disclosure).

Upon receipt by the Self-Operation entity of message 5011 and 5012, the Self-Operation entity 5106 may extract the attributes in each respective message. In some such example implementations, the Self-Operation entity 5106 may then search its database for the similar self-operation cases of Experience of Available Resources and/or Experience of Missing Resources. This search may involve the use of the AvailableResources and/or Missing Resources attributes and/or values, and/or may involve a values such that event=TTAofAvailableResource and/or TTAof Missing Resource. In some example implementations, in connection with the search, the Self-Operation entity may create a self-operation case for each of messages 5011 and/or 5012 and collect the extracted attributes from each such message. It will be appreciated that some example implementations of such self-operation cases may be considered to be a self-operation case of Experience of Available Resources and a self-operation case of Experience of Missing Resources, which may be defined in accordance with the Type 3 and 4 cases set out below. As shown in FIG. 5, in some example implementations of message flow 5000, the Self-Operation entity 5106 replies to the Operator Service Portal 5104 with messages 5013 and 5014. In some example implementations, messages 5013 may take the form of the found TTA for the AvailableResources for a given ServiceRequestID. In some example implementations, message 5014 may take the form of the found TTA for the Missing Resources, if MissingResources ≠ NULL.

Upon receipt of messages 5013 and 5014, as necessary, the Operator Service Portal 5104 may perform operation 5015, which, in some example implementations, involves defining the costs for a given ResourceDemand with the available resources associated with a given ServiceRequestID. In some example implementations, the Operator Service Portal 5014 may perform operation 5016, which, in some example implementations, involves defining the costs associated with Missing Resources and/or other additional resources needed with respect to a ServiceRequestID, in situations where MissingResources ≠ NULL. In some example implementations of message flow 5000 in general, and with particular reference to operations 5015 and 5016, the Operation Service Portal 5014 may use the received found TTA and ServiceRequestID information then, defines the costs of the AvailableResources and Missing Resources, in a manner that can be expressed as Costs=(max(all TTAs), combined price of the resources).

As shown in FIG. 5, upon calculating and/or otherwise defining the relevant costs associated with a given ServiceRequestID, the Operator Service Portal 5104 may create a corresponding service offer and transmit the offer to the customer 5102 in message 5017. In some example implementations, message 5017 may take the form of (ServiceRequestComplete, TotalTTA, TotalPrice) and may further include a request that the customer 5102 review the offer. The customer 5102 may then accept the offer via message 5018 (which may, for example take the form of an SLA confirmation and/or otherwise reflect that a service offer for a particular ServiceRequestID has been accepted) or reject the offer via message 5018' (which may take the form of an SLA rejection and/or otherwise reflect that a service offer for a particular ServiceRequestID has been rejected). In some example implementations, in connection with either message 5017, message 5018, and/or message 5018', the operator service portal 5104 may create an SLA instance reflecting the given ServiceOffer, and associate the SLA instance with the relevant ServiceRequestID.

---

Type 3. Self-operation case for Experience of Available Resources

Event = TTAofAvailableResource
context = AvailableResources
action = search self-operation database
    // it searches the successful experiences collected in the self-operation
    cases of "Experience of // Available Resources". Those cases
    belong to the groupIDs that have successfully
    // provisioned the service. The successful provisioning of the service
    can be identified from the
    // self-operation case of "Experience of SLA Offer and
    implementation" under the same
    // groupIDs.
result = TTA // Time-to-available of the formerly used resources in the matching self-operation cases
profile = NULL
groupID = ServiceRequestID

---

Type 4. Self-operation case for Experience of Missing Resources

Event = TTAofMissingResource
context = MissingResources
action = search self-operation database
    // it searches the successful experiences collected in the self-operation
    cases of "Experience of // Available Resources". Those cases
    belong to the groupIDs that have successfully
    // provisioned the service. The successful provisioning of the service
    can be identified from the
    // self-operation case of "Experience of SLA Offer and
    implementation" under the same
    // groupIDs.
result = TTA // of the formerly missing but then added resources in the matching self-operation cases
profile = NULL
groupID = ServiceRequestID

---

When Operator Service Portal 5104 receives the acceptance/rejection (such as through the receipt of messages 5018 and/or 5018', it may send message 5019 to the Self-Operation entity 5016 sends an indication to Self-Operation on the acceptance or rejection. In some example implementations, message 5019 may take the form of an SLA instance, which may, in some example situations, be used to pass one or more ServiceRequirementComplete, OperatorRequirement, ResourceDemand with TTA, and/or Missing ResourceDemand with TTA attributes and/or values associated with a given ServiceRequestID. In some example implementations of message flow 5000, when the Self-Operation entity 5106 receives the indication (such as through message 5019, for example) it creates a self-operation case of SLA Experiences as set out below with respect to "Type 5" cases.

In some example implementations, if the ServiceOffer is accepted by the customer 5102, the Operator Service Portal 5104 may transmit to the Self-Operation entity 5106 message 5020, which may include a request for services to be provisioned for the associated ServiceRequestID. Similarly, if the operative ServiceOffer is rejected, the Operator Service Portal 5104 may transmit to the Self-Operation entity 5106 message 5020', which may include an indication that the service offer associated with a given ServiceRequestID has been rejected.

In addition to notifying the Self-Operation entity that a ServiceOffer has been accepted, the Operator Service Portal 5104 may transmit messages 5021 to the MANO entity 5108 and the OSS/BSS entity 5110. In some example implementations, message 5021 may include requests for the allocation of PNF/VNF resources associated with a given ServiceRequestID and/or a given ResourceDemand. Moreover, in some example implementations, message 5021 may also include a request for an allocation with respect to a MissingResourcesDemand if MissingResources ≠ NULL. As shown in FIG. 5, the MANO entity 5108 and the OSS/BSS entity 5110 may respond to the Operator Service Portal 5104 with message 5022. In some example implementations, message 5022 may include an identification of the PNF and/or VNF resources associated with a given ResourceDemand and/or an indication an allocation associated with a MissingResourceDemand for a given ServiceRequestID. In some example implementations of message flow 5000, the Operator Service Portal may then transmit message 5023 to the OSS/BSS entity 5110. In some example implementations, message 5023 may include instructions and/or other information associated with the configuration of PNFs and/or VNFs as may be in accordance with found configurations for a given ServiceRequestID. Upon receipt and processing of message 5023, the OSS/BSS entity 5110 may respond with message 5024, which, in some example implementations, includes an indication to the Operator Service Portal entity 5104 that a requested configuration has been completed.

In some example implementations that arise in situations where the service offer is accepted, the Self-Operation entity 5104 may further update the result of the Type 5 self-operation case from "accept" into Provisioned when upon receipt of message 5025 (which, in some example implementations, indicates that service has been provisioned for a given SLA associated with a particular ServiceRequestID), with the metadata describing the provisioned resources of the NFs (VNFs and PNFs) and CM data. As shown in FIG. 5, the Operator Service Portal entity 5104 may also (through the operation of message 5026, for example) indicate to the customer 5102 that service has been provisioned with respect to a given ServiceRequestID associated with the accepted service offer.

Moreover, as shown in connection with message 5027 and 5028, the Self-Operation entity may receive additional information from the MANO entity 5108 and the OSS/BSS entity 5110. In some example implementations, the MANO entity 5108 may send operation experiences associated with a given ServiceRequestID, such as metadata and/or identification of the type and resources of VNFs that may be provisioned, for example. With respect to message 5028, the OSS/BSS entity 5110 may provide information regarding the operation experiences associated with a given ServiceRequestID, which may include, for example, CM data, a summary of PM data, FM data, and/or the like, including but not limited to such information as it may apply to virtual and/or physical network functions (VNFs and/or PNFs). Upon receipt message 5027 and/or message 5028, the Self-Operation entity 5106 may update the result of the Type 5 self-operation case (which may involve the use of a ServiceFulfillment object, attribute, and/or value) with the received information.

---

Type 5. Self-operation case for SLA Experience

--- event = SLAReviewed
context = { ServiceRequestComplete ∪ OperatorRequirement ∪ TotalTTA }
action = record the further received context and result (if accepted) | NULL (if rejected)
result = "rejection" | "acception" | Provisioned | ServiceFillfilment
 // result is extracted progressively from the further received Message (20), (20'), (25), (27), and (28)
 // in the message sequence diagram (in Figure 3).
 Where
  Provisioned = describing the provisioned resources of the NFs (VNFs and PNFs) and
   CM data
  ServiceFillfilment = OperationExperiences (metadata describing the correlation between
   the Provisioned and the actual usage of the resources and performance regarding the SLA defined objectives and requirements (CM data, summary of CM, PM and FM data, etc.) of the NFs (virtual & physical))
profile = relation between context and result
 // calculated with all the SLAOffer self-operation cases
groupID = ServiceRequestID

---

Referring now to FIG. 6, the operations performed by the apparatus 200 of FIG. 2 in accordance with an example embodiment of the present invention are depicted as an example process flow 800. In this regard, the apparatus includes means, such as the processor 202, the memory 204, the user interface 206, the communication interface 208 or the like, for receiving, at a service order portal, a request for network service, wherein the request for network service comprises a service requirements set, and wherein the service requirements set comprises a plurality of service requirements; determining, automatically and based at least in part on the service requirements set, a network resource set and a network configuration adapted to fulfill each service requirement within the plurality of service requirements associated with the service requirements set; determining, automatically, a time parameter, wherein the time parameter comprises an indication of the amount of time necessary to provide the network resource set and the network configuration necessary to fulfill each service requirement within the plurality of service requirements associated with the service requirements set; transmitting a proposed network service allocation set, wherein the proposed network service allocation set comprises the time parameter and an indication of the network resource set and the network configuration adapted to fulfill each service requirement within the plurality of service requirements associated with the service requirements set; receiving an indication that the proposed network service allocation set has been accepted; and providing, automatically, network services in accordance with the proposed network service allocation set.

The apparatus includes means, such as the processor 202, the memory 204, the user interface 206, the communication interface 208 or the like, for receiving, at a service order portal, a request for network service, wherein the request for network service comprises a service requirements set, and wherein the service requirements set comprises a plurality of service requirements. With reference to FIG. 6, process flow 600 may commence at block 602, which includes receiving a service request. In general, example implementations of block 602 involve receiving a request for network services from an entity associated with providing network services to one or more network devices, such as a mobile virtual network operator, for example, or another tenant and/or virtual network provider who may be involved in requesting and/or otherwise acquiring service from a network infrastructure provider and/or operator, for example. As discussed herein, modern networks are increasingly faced with widely divergent demands for network services, based at least in part on the increasing diversity of user equipment and other device that are capable of interacting with a communications network. As such, any approach to receiving a request for network services may be used in example implementations of block 602, including but not limited to the approaches and aspects discussed and/or otherwise disclosed herein with respect to an operator service portal and/or other network entities reflected in FIGS. 3, 4a, 4b, and/or 5. In some example implementations of block 602, the received request may include requirements expressed by a user and/or otherwise regarding the parameters and/or other characteristics of the service required by a given user, device, and/or set of devices. As noted and discussed herein, in some situations, the service requirements set received from a user may be incomplete, at least in the sense that it does not reflect all of the requirements associated with enabling a device and/or devices to operate in an intended manner, and/or lacks requirements that may be unknown and/or otherwise unexpressed by a given user. In some such example implementations, the incomplete nature of the request set may cause a network entity, such as an operator service portal, for example, to interact with a Self-Operation entity and/or other network entity to access and query a database and/or otherwise obtain information regarding similar and/or otherwise potentially relevant requirements sets.

The apparatus also includes means, such as the processor 202, the memory 204, the user interface 206, the communication interface 208 or the like, for determining, automatically and based at least in part on the service requirements set, a network resource set and a network configuration adapted to fulfill each service requirement within the plurality of service requirements associated with the service requirements set. With reference to FIG. 6, process flow 600 may continue to block 604, which includes automatically determining a network resource set and network configuration. As noted herein, some example implementations of embodiments of the invention contemplate facilitating the automatic requesting of network services. Any approaches to doing so, including but not limited to those discussed herein with reference to FIGS. 3, 4a, 4b, and/or 5 may be used in connection with example implementations of block 604. In some example implementations of block 604, the set of resources and/or network configuration that may be reflected in a given SLA may be identified and prepared. In some such example implementations, and in other example implementations, this may involve detecting that the service requirements set received from the user is an incomplete set. In such situations, where the received requirements set may be incomplete, an operator service portal may interact with a self-operation entity and/or other network function or entity to identify additional network resources and/or network configurations that should be considered to ensure that a given SLA and/or request captures the requirements and/or network configuration necessary to ensure that the user device and/or devices operates in accordance with the expectations of the user and/or the abilities of the network.

In example implementations where the requirements set is complete and/or has been completed and/or otherwise augmented by the operator service portal (which may, for example work in conjunction with a self-operation entity and/or other network element) determining the network resource set and the network configuration adapted to fulfill each service requirement within the plurality of service requirements associated with the service requirements set may comprise requesting a prior configuration data set. Any approach to acquiring and using such prior configuration information may be used in such example implementations, including but not limited to those discussed herein, such as those that contemplate the use of and/or interaction with a Self-Operation entity to identify similar and/or otherwise potentially relevant prior situations from which configuration information may be extracted and/or otherwise obtained and applied in connection with a pending service request.

The apparatus also includes means, such as the processor 202, the memory 204, the user interface 206, the communication interface 208 or the like, for determining, automatically, a time parameter, wherein the time parameter comprises an indication of the amount of time necessary to provide the network resource set and the network configuration necessary to fulfill each service requirement within the plurality of service requirements associated with the service requirements. With reference to FIG. 6, process flow 600 may proceed to block 606, which includes automatically determining a time to availability. As discussed herein with reference to FIGS. 3, 4a, 4b, and 5, some example implementations of embodiments of the invention involve determining the time necessary to acquire and/or otherwise allocate the network resources necessary to fulfill the requirements a particular request. In some example implementations of block 606, determining a time parameter includes calculating and/or otherwise determining a time to availability, or TTA. In some such example implementations, this may involve requesting a prior timing data set, which may, for example be acquired through the action of a Self-Operation entity, which may access and/or otherwise acquire information associated with previous similar and/or otherwise relevant prior allocations. In some such example implementations, and in other example implementations, requesting a prior timing set may involve interacting with other network entities, such as a MANO entity, an OSS entity, a BSS entity, and/or other network entities to acquire such timing information.

The apparatus also includes means, such as the processor 202, the memory 204, the user interface 206, the communication interface 208 or the like, transmitting a proposed network service allocation set, wherein the proposed network service allocation set comprises the time parameter and an indication of the network resource set and the network configuration adapted to fulfill each service requirement within the plurality of service requirements associated with the service requirements set. With reference to FIG. 6, process flow 600 may proceed to block 608, which includes transmitting a proposed network allocation. As discussed herein, many example implementations of embodiments of the invention are aimed towards automatically requesting, defining, and/or providing user-specific network resources. As such, and as discussed herein (such as in connection with FIGS. 3, 4a, 4b, and 5, for example) some example implementations of embodiments of the invention contemplate automatically developing an SLA and/or terms for inclusion in an SLA, such that a user may be able to approve and/or reject a proposed set of network resource allocations and/or network configuration allocation that is designed to meet the requirements of a given user to the extent possible in view of the capabilities and/or other parameters associated with a given network environment. In some example implementations, in addition to presenting the proposed network resource set and/or network configuration to a user, additional information may be provided, such as TTA information and/or cost information, for example. In some example implementation of block 608, the proposed network service allocation further includes a cost parameter, wherein the cost parameter is associated with the network resource set and the network configuration necessary to fulfill each service requirement within the plurality of service requirements associated with the service requirements set. This cost parameter may include, for example, a total cost and/or set of partial costs associated with one or more resources and/or configurations, and may, for example be provided in accordance with a price table or other file that can be accessed by the service order portal for calculating the total price. It will be appreciated that, in some example implementations, the price table can be updated by an operator independently and/or from time to time. Any approach to transmitting and/or otherwise presenting a proposed network service allocation set may be used in connection with example implementations of block 608, including but not limited to those discussed herein with respect to the interactions between an operator service portal and a customer.

The apparatus also includes means, such as the processor 202, the memory 204, the user interface 206, the communication interface 208 or the like for receiving an indication that the proposed network service allocation set has been accepted. With reference to FIG. 6, process flow 600 may proceed to block 610, which includes receiving an acceptance of the proposed network allocation from a relevant entity. As discussed herein, the operation of an operator service portal entity, a self-operation entity, and the other network functions, entities, and interfaces discussed and/or referenced herein are directed to automatically arriving at a defined network service that can fulfill the requirements of a given user within the capabilities of a network. As such, and as presented in connection FIGS. 3, 4a, 4b, and 5, for example, some example implementations of process 600 contemplate that a user will accept the proposed SLA and/or other proposed network service allocation and so indicate, such as via an interface with an operator service portal entity and/or through other approaches.

The apparatus also include means, such as the processor 202, the memory 204, the user interface 206, the communication interface 208 or the like for providing, automatically, network services in accordance with the proposed network service allocation set. With reference to FIG. 6, process flow 600 may proceed to block 612, which includes automatically providing network services to the user. As discussed herein, including but not limited to with respect to FIGS. 3, 4a, 4b, and 5, for example, the operator service portal entity and/or self-operation entity are capable of interacting with other network entities to identify available resources, determine metrics associated with such resources (such as TTA, for example) and cause those resources to be allocated to a given user. For example, an operator service portal and/or a self-operation entity may instruct and/or otherwise interact with a MANO entity and/or an OSS/BSS entity, for example, to cause virtual and/or physical network functions to be provided to a user in accordance with the agreed upon SLA and/or other agreed allocation.

As described above, FIGS. 3-6 illustrate block diagrams, message flows and flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

APPENDIX

This appendix contains a series of tables that are referenced throughout this disclosure. It will be appreciated that standardization of one or more interfaces as set out in the following tables and otherwise reflected within this disclosure may be beneficial in accomplishing aspects of embodiments of the invention in multi-operator network environments.

TABLE 1

Data elements of a Cu-SOC interface, for automated service provisioning related data elements via Cu-SOC interface.

| Data elements | Data attributes | Remarks | Data source and target |
|---|---|---|---|
| Service Request ID (SR-ID) | Unique identifier of the service request | This ID identifies the messages sent over itf Cu-SOC, where the messages are for the request, offering, and provisioning of a specific service to the customer. It is also used by the system to identify the data instances of the specific service, throughout the Service Orchestration processes. | Created by Service Order Portal for the customer initiated Service Request instance Between SOC and Customer |
| Credential of Operator | A unique piece of data that can authenticate the operator. | This data is used to authenticate an operator to a customer. | From SOC to Customer |
| Credential of Customer | A unique piece of data that can authenticate the customer. | This data is used to authenticate a customer to an operator. | From Customer to SOC |
| Owner of the service | Identifier/name of the customer, MVNO or tenant | e.g., PLMN ID, to identify the unique customer or tenant | From Customer to SOC |
| Service name or type | Unique name of the service | Service name or type that is describing the Service. Service name shall be attached to the network slice identifier later. This way the network elements forming the slice will report their purpose to provide a dedicated service. If the network element shall provide multi-services, it will report multiple network slice identifiers. Examples__ Basic mobile broadband Remote healthcare Connected driving IoT services (e.g. sensors, surveillance cameras, etc.) Robotics Industry/logistics communications Etc. | From Customer to SOC |
| Requirements for network characteristics | Latency Reliability-Availability Security Throughput in RAN/MBH Connectivity in RAN/MBH Signal strength/SINR Bandwidth Etc. | Target values or Thresholds as defined e.g. 10 ms e.g. 99.999% e.g. high e.g. 1 Gbit/s e.g. SDN, SDM-X VNFS e.g. −100 dBm/2 dB @ cell edge e.g. 60 MHz @ 3.5 GHz band | Initially from Customer to SOC and later, between Customer and SOC |
| Application requirements | Name of the application(s) Number of applications/devices/subscribers/users Memory consumption Time profile of application usage Etc. | Attributes that affects the dimensioning of the NFVI e.g. 10000 devices with 10 Mbits/s | Initially from Customer to SOC and later, between Customer and SOC |
| Requirements for transport and connectivity characteristics | QoS/QoE MBH & SDN domain specific characteristics | Target values or Thresholds as defined Attributes that affects the dimensioning of the IP-routers & SDN controllers e.g. 100 Gbit/s capacity | Initially from Customer to SOC and later, between Customer and SOC |
| Objectives for performance and service quality | KPI1 KPI2 KQI1 KQI2 Etc. | Target values or Thresholds as defined e.g. KPI1 > a e.g. KPI2 ≤ b e.g. KQI1 < c e.g. d < KQI2 < e | Initially from Customer to SOC and later, between Customer and SOC |

TABLE 1-continued

Data elements of a Cu-SOC interface, for automated service provisioning related data elements via Cu-SOC interface.

| Data elements | Data attributes | Remarks | Data source and target |
|---|---|---|---|
| Business objectives | Time-to-Market Duration of the service lifecycle - network slice lifetime Time profile of the service (e.g. daily vs. nightly profile) Etc. | Attributes that rule the capacity management of NFVI in time (always on, random, by demand, predefined time window, etc.) | Initially from Customer to SOC and later, between Customer and SOC |
| Service area | Accurately defined geographical area, where service requestor wants to establish the service | Can be given as polygon, address, building, geographical area on a map (e.g. town, blocks, etc.) | From Customer to SOC |
| Network slice HW resource inventory list | List of the network elements needed in the network slice (e.g. MO IDs) summarizing both AvailableResources and MissingResources. List of the volumes of different VNFs and PNFs-HW base and virtual platform resource inventory list with mapping to data center HW units | The service offer cost estimation is done based on the HW resource inventory list describing the necessary HW units to establish the service in the network slice. | From SOC to Customer for the network slice based on the customer given service area |
| Cost estimation for the provisioning of the new service | Total cost: infra (HW) energy consumption extra work due to installation of new infra or extra HW resources | Number of Racks or Containers (NFVI) and HW units (bare metal BTS) define together the total HW costs. Cost estimation includes also all additional costs and operator's profit margins that come on top of it. Customer sees the cost estimation as a rent to be paid for the infra enabling the service execution (e.g. monthly fee or payment per usage or per data transfer) | From SOC to Customer, Details of the cost estimation process is not part of this invention. |
| Estimated Time-to-Availability (TTA) | | Time needed to setup the service in the network, to prepare and configure the NFs and prepare for the HW resources + SW downloads. | From SOC to Customer |
| Decision on the proposed complete service request | Accept/reject | If accepted: Objectives and requirements for the service have been mutually agreed between operator and customer. Service Order instance is created by the Service Order Portal and the further steps in defining the configurations and needed resources for NFs with respect to service fulfilment and assurance are going to be carried out based on that. ServiceRequestComplete = Service Order | From Customer to SOC |
| Decision on the service offer | Accept/reject | If accepted: Objectives and requirements for the service have been mutually agreed between operator and customer. SLA instance is created and service fulfilment and assurance is going to be carried out based on that. | From Customer to SOC |

TABLE 2

Data elements of Op-SOC interface, needed for the service evaluation and "response to service request" related data elements via Op-SOC interface.

| Data elements | Data attributes | Remarks | Data source and target |
|---|---|---|---|
| Operator preferences for service provisioning | Preferred technology or network layer to set up the service | Operator preferences or criteria that are affecting the selection of the network elements in the network slice. These can be given as pre-defined rules in service order portal. | From Operator to SOC |
| Virtualisation level | Dedicated vs. shared Bare metal vs. NFV | Operator's policy that is needed for assessing the availability, utilization rate and capacity of current HW infra vs. need for additional investment. | From Operator to SOC |
| Operator policies | Priorities for service fulfilment Order of the SLA requirements and objectives Over-dimensioning allowed Overbooking allowed Preferences for service fulfilment Etc. | Attributes that may impact the dimensioning of the network resources. Prioritization of objectives e.g. in descending order Reservation of redundant or spare capacity e.g. for high traffic peaks or outage resolution. These can be given by some predefined templates or rules in Policy Management. | From Operator to SOC |

TABLE 3

Data elements of Oss-SOC and MANO-SOC interfaces, for calculating the remaining available resources that the current network layout can provide.

| Data elements | Data attributes | Remarks | Data source and target |
|---|---|---|---|
| Network slice identifier | Customer given geographical area as converted to scope or network slice - unique identifier of the elements forming the network slice in the current network layout (e.g. partitioning of the network). | Network slice identifier is used to identify cells or network elements that are forming the network slice. Network slice shall have its own identifier that is attached to each of the network elements (e.g. radio cells) belonging to it. In case network element is a shared resource, it will have more than one slice identifier attached. Network elements belonging to the network slice will require resources. This ResourceDemand can be either determined manually by network planning and dimensioning or automatically by self-operation (as described in this invention report). | From OSS and MANO to Service Order portal See Table 1. This information is also mediated via interface Cu-SOC to customer as part of the content of the Service Offer. |
| AvailableResources | HW resources available in the current network layout and/or in the data center enabling the network slice. List of HW base for PNFs Capacity attributes (e.g. Traffic load, bandwidth, utilization rate, etc.) Summary of Data center virtual platform resources allocated | Service Order Portal uses the input (as above) of the needed network elements forming the network slice to determine the Available Resources via OSS and/or MANO. It determines the remaining available capacity to provide service in the network slice. There may be also shared resources in the slice reducing the remaining available capacity. This is not an input to any self-operation case, but the information is needed in order to be able to calculate if ResourceDemand (as output from self-operation or from network planning if manually | From OSS and MANO to SOC |

TABLE 3-continued

Data elements of Oss-SOC and MANO-SOC interfaces, for calculating the remaining available resources that the current network layout can provide.

| Data elements | Data attributes | Remarks | Data source and target |
| --- | --- | --- | --- |
| | Data center installed HW resource base Time to Availability (TTA) | executed) can be satisfied with AvailableResources or is there a need to implement additional resources (as identified by MissingResourceDemand) (see Table 4 below) | |
| PNF/VNF configurations and parameter values + needed resources as extracted through the Matching self-operation cases | List of elements/ functions needed in the service area/ network slice PNF descriptor PNF ID (MO ID/ Cell ID) PNF type (e.g. BTS) PNF HW resource type (e.g. BTS type/model) PNF configuration (CM data, parameter values) VNF descriptor VNF ID (MO ID/ Cell ID) VNF type (e.g. cloudBTS or SDN controller) VNF configuration (CM data, parameter values) VNF virtual platform resource needs: number of VMs and CPUs, storage disk space, memory | Contains a list of elements/ network functions that are needed in the service provisioning to pursue the fulfilment of the objectives and requirements given by the SLA. The numerical values as extracted from the matching self-operation cases. Instantiation of the VNFs in NFVI can be based on the Heat-templates. BTS site configurations can be based on BTS configuration templates. As soon as the resources have been allocated and informed to the Service Order portal, the configurations can be provisioned from OSS via the ems-nbi interface to the network elements (PNFs & VNFs) and VNFs instantiated to the VMs via the VNFM and VIM layers in MANO. | From SOC to OSS/MANO |

TABLE 4

Data elements for selfop-oss & selfop-mano interfaces, related to operation experiences (i.e. correlations between configurations, performances and resources of the service fulfilment), which are the attributes that needs to be collected and stored into the corresponding self-operation cases as soon as the service fulfilment according to the current SLA has been achieved.

| Data elements | Data attributes | Remarks | Data source and target |
| --- | --- | --- | --- |
| HW resources of the physical network elements | PNF descriptor PNF ID (MO ID/ Cell ID) PNF type (e.g. BTS) PNF HW resource type (e.g. BTS type/model) PNF context (CM/PM data) Optional: Energy consumption per HW resource (e.g. | Attributes (CM & PM) defining the function specific context - prior art as described in [1]. Note: Context with regard to the network elements' configuration and performance can be defined for physical and virtual NFs in the same way. Decompose the network slice to the NFs and differentiate them by their context. Measure or define the capacity demand by each NF one by one. Data collected for those physical network functions | From OSS/NMS to SOC, which is to be stored in the corresponding self-operation cases. |

TABLE 4-continued

Data elements for selfop-oss & selfop-mano interfaces, related to
operation experiences (i.e. correlations between configurations, performances and
resources of the service fulfilment), which are the attributes that needs to be collected
and stored into the corresponding self-operation cases as soon as the service fulfilment
according to the current SLA has been achieved.

| Data elements | Data attributes | Remarks | Data source and target |
|---|---|---|---|
| | eNB) TTA per HW type/model | included in the service area/ network slice via OSS/NMS and stored in the corresponding self-operation cases. | |
| HW resources of the virtual network functions | VNF descriptor VNF ID (MO ID/ Cell ID) VNF type (e.g. cloudBTS or SDN controller) VNF context (CM/PM data) traffic load (@ peak hour) number of applications/devices/ users (@peak hour) VNF virtual platform resource needs measured @ peak hour: number of VMs and CPUs, storage disk space, memory consumption Optional: Energy consumption per datacenter resource (server or rack) Data Center Infrastructure (e.g. OpenStack/Vm ware, Server model- HP/Airframe) TTA per HW type/model | Data collected for those virtual network functions included in the service area/network slice via MANO and stored in the corresponding self-operation cases. Capacity or computing demand per VNF may vary based on the Traffic volume Number of users, devices, applications Time → Capacity demand needs to be measured during the peak traffic hour in order to reflect the maximum capacity needed Capacity units NFVI: Total number of DC racks or containers needed in the network slice can be calculated based on the measured cumulative number of CPUs, VMs, storage disk space, memory consumption over all of the VNFs forming the network slice. Bare metal: installed HW base calculated over all the Phy-NFs included in the service area. This calculation can take place in Service Order Portal/SOC. | From OSS/NMS and MANO to SOC which is to be stored in the corresponding self-operation cases. |
| ResourceDemand | HW resources needed in the network slice in order to provision the service according to the SLA. List of Summary of HW base for PNFs (e.g. type, BTS model) Summary of data center HW resources needed (e.g. type/server model) TTA per HW type | The definition for Resource Demand and for Missing Resource Demand per Service Request ID can be assisted by self-operation (see Table 5). However, if not enough self-operation cases are found, the definition needs to be escalated to operator. In that case network planning and dimensioning of the resources is needed. Likewise, in case of ResourceDemand > AvailableResources, self-operation can be requested for help. It can either report the MissingResourceDemand if enough self-operation cases found or escalate the definition | Operator's taken action for example in network planning and capacity dimensioning can be collected and stored as a new input into the corresponding self-operation case in the knowledge database |
| MissingResource Demand | List of additional/ missing resources that are seen necessary for the service provisioning. List of Summary of extra HW for | of those additional resources to the operator as above. Operator's taken action can be then recorded and stored in the corresponding self-operation case. Resulting elements and their HW resources, efforts taken in | Calculated in Service Order Portal as: MissingResource Demand = ResourceDemand - AvailableResources |

TABLE 4-continued

Data elements for selfop-oss & selfop-mano interfaces, related to operation experiences (i.e. correlations between configurations, performances and resources of the service fulfilment), which are the attributes that needs to be collected and stored into the corresponding self-operation cases as soon as the service fulfilment according to the current SLA has been achieved.

| Data elements | Data attributes | Remarks | Data source and target |
|---|---|---|---|
| | PNFs Summary of data center extra HW resources needed (e.g. type/model) TTA per HW type | implementation and the time needed for preparations (e.g. sw download, configs, etc.) TTA (Time-to-Availability) are stored in the corresponding self-operation case. The determination of the necessary data center capacity in terms of number of racks or containers can take place for instance in the SOC as soon as the volume of needed virtual platform resources are identified. | |

TABLE 5

Data elements in Selfop-SOC interface.

| Data elements | Data attributes | Remarks | Data source and target |
|---|---|---|---|
| Service Request ID (SR-ID) | Unique identifier of the Service request instance. Attributes of the service request instance as described in Table 1 defining the service and its context with regard to requirements, PM and CM data. | Used to identify a certain Service Request instance through its whole lifecycle. | Created by Service Order Portal for the customer initiated Service Request instance |
| Service Request Partial | As above | The initial state of the service request Can be used to request help from self-operation to complement the initial requirements with better and more accurate and feasible ones. | Service Order Portal request to search knowledge from Self-Operation Search criteria is defined by this input |
| Service Request Complete | As above | Next state of the service request instance updated by Service Order Portal after it has been complemented for example by experiences from self-operation. Can be used to request help from Self-Operation to find suitable configurations and resources to fulfil the objectives and requirements defined by ServiceRequestComplete. It defines the content as per Service request ID and operator's response to it. Attributes as listed in Table 1 incl. network elements of the service area. These inputs (i.e. foreseen objectives and requirements for the service that have not yet been mutually agreed between operator and customer) define the similarity measure to search matching self-operation cases from the database. The outputs | Service Order Portal request to search knowledge from Self-Operation Search criteria is defined by this input. |

TABLE 5-continued

Data elements in Selfop-SOC interface.

| Data elements | Data attributes | Remarks | Data source and target |
|---|---|---|---|
| | | will help to formulate the SLA (with confirmed objectives) and then to trigger the service provisioning with well-known and optimized NF configurations & HW resource allocations | |
| Operator Requirement | Attributes listed in Table 2 Complementing/enriching the context that is used to search matching information from the self-operation database. | Operator's response to service request. | Part of the same request as above. |
| Resource Demand | Configuration HW resources As in Table 4 | | Self-operation reported findings as a response to the above |
| Available Resources | Attributes as in Table 3 Defining the context together with the attributes related to SR-ID to search information from self-operation database | | Given as inputs to self-operation to search for corresponding TTAs |
| Missing resources | Attributes as Table 4 As above. | | |
| Time to Availability (TTA) | Attribute as in Table 4 | | Found attribute values as response from self-operation to the above |

That which is claimed:

1. A method comprising:
 receiving, at a service order portal, a request for network service, wherein the request for network service comprises a service requirements set, and wherein the service requirements set comprises a plurality of service requirements;
 determining, automatically and based at least in part on the service requirements set, a network resource set and a network configuration adapted to fulfill each service requirement within the plurality of service requirements associated with the service requirements set;
 determining, automatically, a time parameter, wherein the time parameter comprises an indication of the amount of time necessary to provide the network resource set and the network configuration necessary to fulfill each service requirement within the plurality of service requirements associated with the service requirements set;
 transmitting a proposed network service allocation set, wherein the proposed network service allocation set comprises the time parameter and an indication of the network resource set and the network configuration adapted to fulfill each service requirement within the plurality of service requirements associated with the service requirements set;
 receiving an indication that the proposed network service allocation set has been accepted; and
 providing, automatically, network services in accordance with the proposed network service allocation set.

2. The method of claim 1, wherein the service requirements set is an incomplete set.

3. The method of claim 1, wherein determining the network resource set and the network configuration adapted to fulfill each service requirement within the plurality of service requirements associated with the service requirements set comprises detecting that the service requirements set is an incomplete set.

4. The method of claim 1, wherein determining the network resource set and the network configuration adapted to fulfill each service requirement within the plurality of service requirements associated with the service requirements set comprises requesting a prior configuration data set.

5. The method of claim 1, wherein determining the timing parameter comprises requesting a prior timing data set.

6. The method of claim 1 wherein providing, automatically, network services in accordance with the proposed network service allocation set comprises transmitting resource allocation instructions from the service order portal to a plurality of network entities.

7. The method of claim 4, wherein requesting a prior configuration data set comprises transmitting a message to a self-operation entity.

8. The method of claim 5, wherein requesting a prior timing data set comprises transmitting a message to a self-operation entity.

9. The method of claim 1, wherein the proposed network service allocation set further comprises a cost parameter, wherein the cost parameter is associated with the network resource set and the network configuration necessary to fulfill each service requirement within the plurality of service requirements associated with the service requirements set.

10. The method of claim 1, wherein the network configuration configures a physical network function and a virtual network function.

11. An apparatus comprising at least one processor and at least one memory storing computer program code, the at least one memory and the computer program code configured to, with the processor, cause the apparatus to at least:
receive, at a service order portal, a request for network service, wherein the request for network service comprises a service requirements set, and wherein the service requirements set comprises a plurality of service requirements;
determine, automatically and based at least in part on the service requirements set, a network resource set and a network configuration adapted to fulfill each service requirement within the plurality of service requirements associated with the service requirements set;
determine, automatically, a time parameter, wherein the time parameter comprises an indication of the amount of time necessary to provide the network resource set and the network configuration necessary to fulfill each service requirement within the plurality of service requirements associated with the service requirements;
transmit a proposed network service allocation set, wherein the proposed network service allocation set comprises the time parameter and an indication of the network resource set and the network configuration adapted to fulfill each service requirement within the plurality of service requirements associated with the service requirements set;
receive an indication that the proposed network service allocation set has been accepted; and
provide, automatically, network services in accordance with the proposed network service allocation set.

12. The apparatus of claim 11, wherein the service requirements set is an incomplete set.

13. The apparatus of claim 11, wherein determining the network resource set and the network configuration adapted to fulfill each service requirement within the plurality of service requirements associated with the service requirements set comprises detecting that the service requirements set is an incomplete set.

14. The apparatus of claim 11, wherein determining the network resource set and the network configuration adapted to fulfill each service requirement within the plurality of service requirements associated with the service requirements set comprises requesting a prior configuration data set.

15. The apparatus of claim 11, wherein determining the timing parameter comprises requesting a prior timing data set.

16. The apparatus of claim 11, wherein providing, automatically, network services in accordance with the proposed network service allocation set comprises transmitting resource allocation instructions from the service order portal to a plurality of network entities.

17. The apparatus of claim 12, wherein requesting a prior configuration data set comprises transmitting a message to a self-operation entity.

18. The apparatus of claim 13, wherein requesting a prior timing data set comprises transmitting a message to a self-operation entity.

19. The apparatus of claim 11, wherein the proposed network service allocation set further comprises a cost parameter, wherein the cost parameter is associated with the network resource set and the network configuration necessary to fulfill each service requirement within the plurality of service requirements associated with the service requirements set.

20. A computer program product comprising at least one non-transitory computer-readable storage medium having computer-executable program code instruction stored therein, the computer-executable program code instructions comprising program code instructions configured to:
receive, at a service order portal, a request for network service, wherein the request for network service comprises a service requirements set, and wherein the service requirements set comprises a plurality of service requirements;
determine, automatically and based at least in part on the service requirements set, a network resource set and a network configuration adapted to fulfill each service requirement within the plurality of service requirements associated with the service requirements set;
determine, automatically, a time parameter, wherein the time parameter comprises an indication of the amount of time necessary to provide the network resource set and the network configuration necessary to fulfill each service requirement within the plurality of service requirements associated with the service requirements;
transmit a proposed network service allocation set, wherein the proposed network service allocation set comprises the time parameter and an indication of the network resource set and the network configuration adapted to fulfill each service requirement within the plurality of service requirements associated with the service requirements set;
receive an indication that the proposed network service allocation set has been accepted; and
provide, automatically, network services in accordance with the proposed network service allocation set.

* * * * *